United States Patent
Miki et al.

(10) Patent No.: US 9,696,891 B2
(45) Date of Patent: Jul. 4, 2017

(54) MOBILE TERMINAL DEVICE, SCREEN CONTROL METHOD, AND NON-TRANSITORY COMPUTER READABLE STORAGE MEDIUM

(71) Applicant: KYOCERA Corporation, Kyoto (JP)

(72) Inventors: Yasuhiro Miki, Ikoma (JP); Toshikazu Kawauchi, Yokohama (JP); Tsuneyasu Inukai, Yokohama (JP); Toshiaki Nade, Yokohama (JP); Shinsuke Moriai, Daito (JP); Masahiro Narita, Higashishirakawa-gun (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/751,068

(22) Filed: Jun. 25, 2015

(65) Prior Publication Data

US 2015/0293671 A1    Oct. 15, 2015

Related U.S. Application Data

(63) Continuation of application No. PCT/JP2013/084530, filed on Dec. 24, 2013.

(30) Foreign Application Priority Data

Dec. 25, 2012    (JP) .................................. 2012-281785

(51) Int. Cl.
G06F 3/041        (2006.01)
G06F 3/0484       (2013.01)
(Continued)

(52) U.S. Cl.
CPC ........ *G06F 3/04842* (2013.01); *G06F 1/1626* (2013.01); *G06F 1/1692* (2013.01);
(Continued)

(58) Field of Classification Search
CPC ............. G06F 3/04886; G06F 3/04817; G06F 3/04845; H04M 2250/22
(Continued)

(56) References Cited

U.S. PATENT DOCUMENTS

2010/0013780 A1    1/2010   Ikeda et al.
2011/0276911 A1*   11/2011  Choi ..................... G06F 9/4445
                                                         715/769

(Continued)

FOREIGN PATENT DOCUMENTS

JP    2009-223426 A    10/2009
JP    2010-26710 A      2/2010
(Continued)

OTHER PUBLICATIONS

Written Opinion of the International Searching Authority issued by Japan Patent Office for International Application No. PCT/JP2013/084530.

(Continued)

*Primary Examiner* — Calvin C Ma
(74) *Attorney, Agent, or Firm* — Procopio Cory Hargreaves and Savitch LLP

(57) ABSTRACT

A mobile terminal device and methods are disclosed. A casing has a plurality of surfaces. A display module is provided on a first surface of the casing and displays a screen including an object. A first detection module is provided to overlap at least part of the display module and detects an operation performed on the display module. A second detection module is provided on a second surface opposite to the first surface and detects a movement operation for moving the screen. A control module cuts out at least a partial region including the object from the screen and moves the cut region according to the movement operation, when the movement operation has been detected.

17 Claims, 18 Drawing Sheets

EXAMPLE OF RETURN OF WINDOW REGION TO INITIAL POSITION BY OPERATING BACK KEY

WINDOW REGION RETURNS TO INITIAL POSITION

(51) Int. Cl.
  *G06F 1/16* (2006.01)
  *G06F 3/0483* (2013.01)
  *G06F 3/0485* (2013.01)
  *G06F 3/0488* (2013.01)
  *G06F 3/0354* (2013.01)
  *G06F 3/0481* (2013.01)

(52) U.S. Cl.
  CPC ........ *G06F 3/03547* (2013.01); *G06F 3/0483* (2013.01); *G06F 3/0485* (2013.01); *G06F 3/04817* (2013.01); *G06F 3/04845* (2013.01); *G06F 3/04883* (2013.01); *G06F 3/04886* (2013.01); *G06F 2203/04803* (2013.01); *H04M 2250/22* (2013.01)

(58) Field of Classification Search
  USPC .......................................... 345/168, 173, 174
  See application file for complete search history.

(56) References Cited

U.S. PATENT DOCUMENTS

| | | | |
|---|---|---|---|
| 2012/0007822 A1* | 1/2012 | Luo | ........................ G06F 3/041 345/173 |
| 2012/0113007 A1* | 5/2012 | Koch | .................... G06F 3/0488 345/168 |
| 2012/0188243 A1 | 7/2012 | Fujii et al. | |
| 2012/0249459 A1 | 10/2012 | Sashida et al. | |
| 2014/0092048 A1 | 4/2014 | Yamamoto | |
| 2016/0041721 A1 | 2/2016 | Fujii et al. | |

FOREIGN PATENT DOCUMENTS

| | | |
|---|---|---|
| JP | 2011-070609 A | 4/2011 |
| JP | 2012-155557 A | 8/2012 |
| JP | 2012-203895 A | 10/2012 |
| WO | 2012/061628 A2 | 5/2012 |
| WO | 2012/157367 A1 | 11/2012 |

OTHER PUBLICATIONS

International Search Report dated Apr. 1, 2014, issued for International Application No. PCT/JP2013/084530.

office Action dated Nov. 8, 2016 issued by Japanese Patent Office in counterpart Japanese Application No. 2012-281785.

office Action dated Jan. 24, 2017 issued by Japan Patent Office in counterpart Japanese Application No. 2012-281785.

* cited by examiner

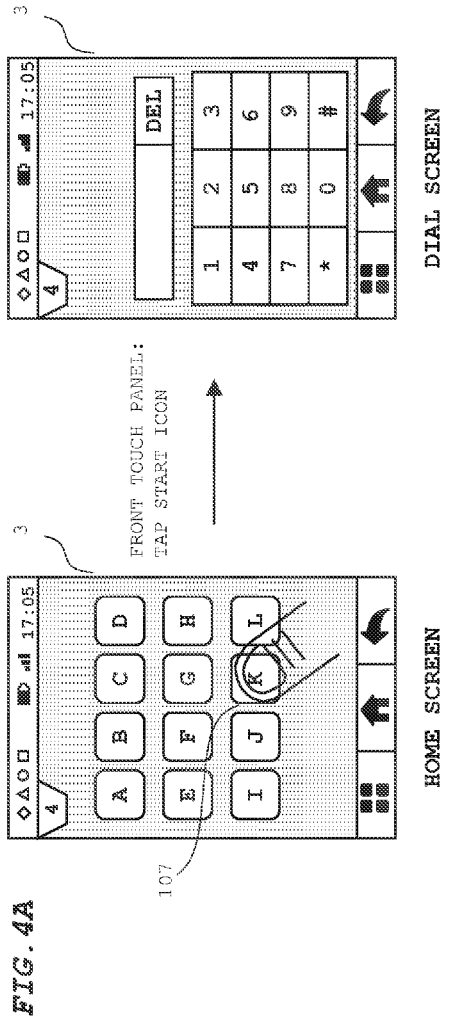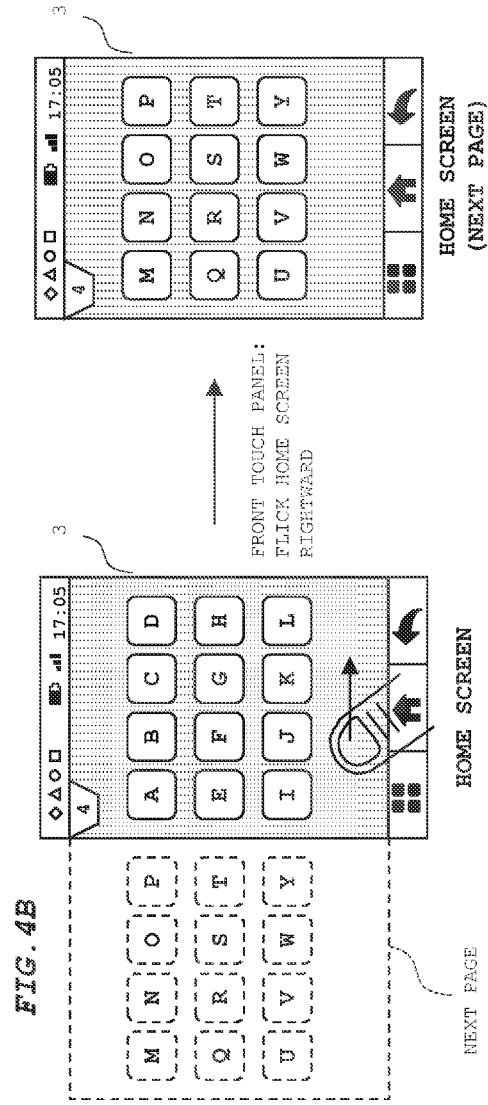

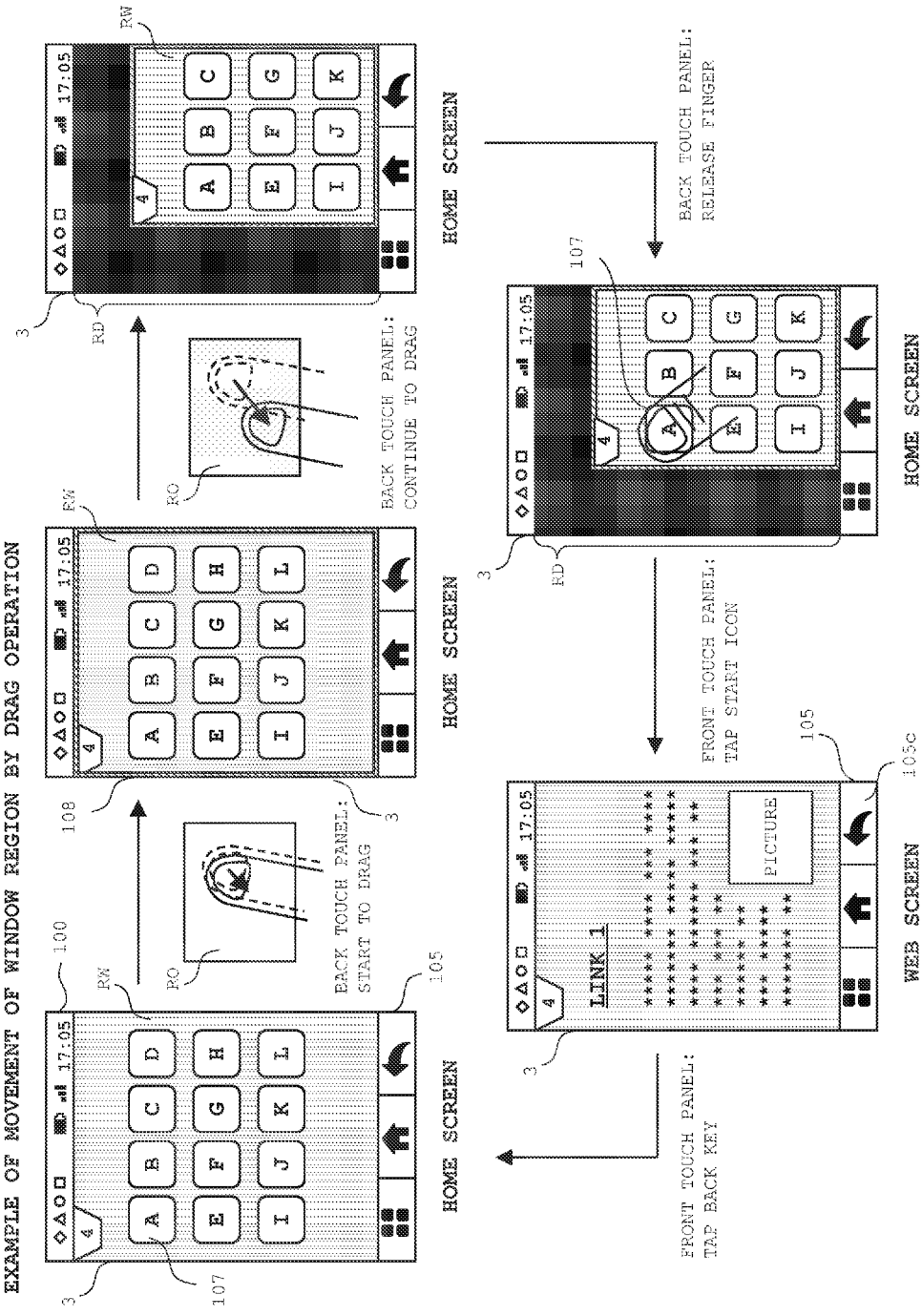

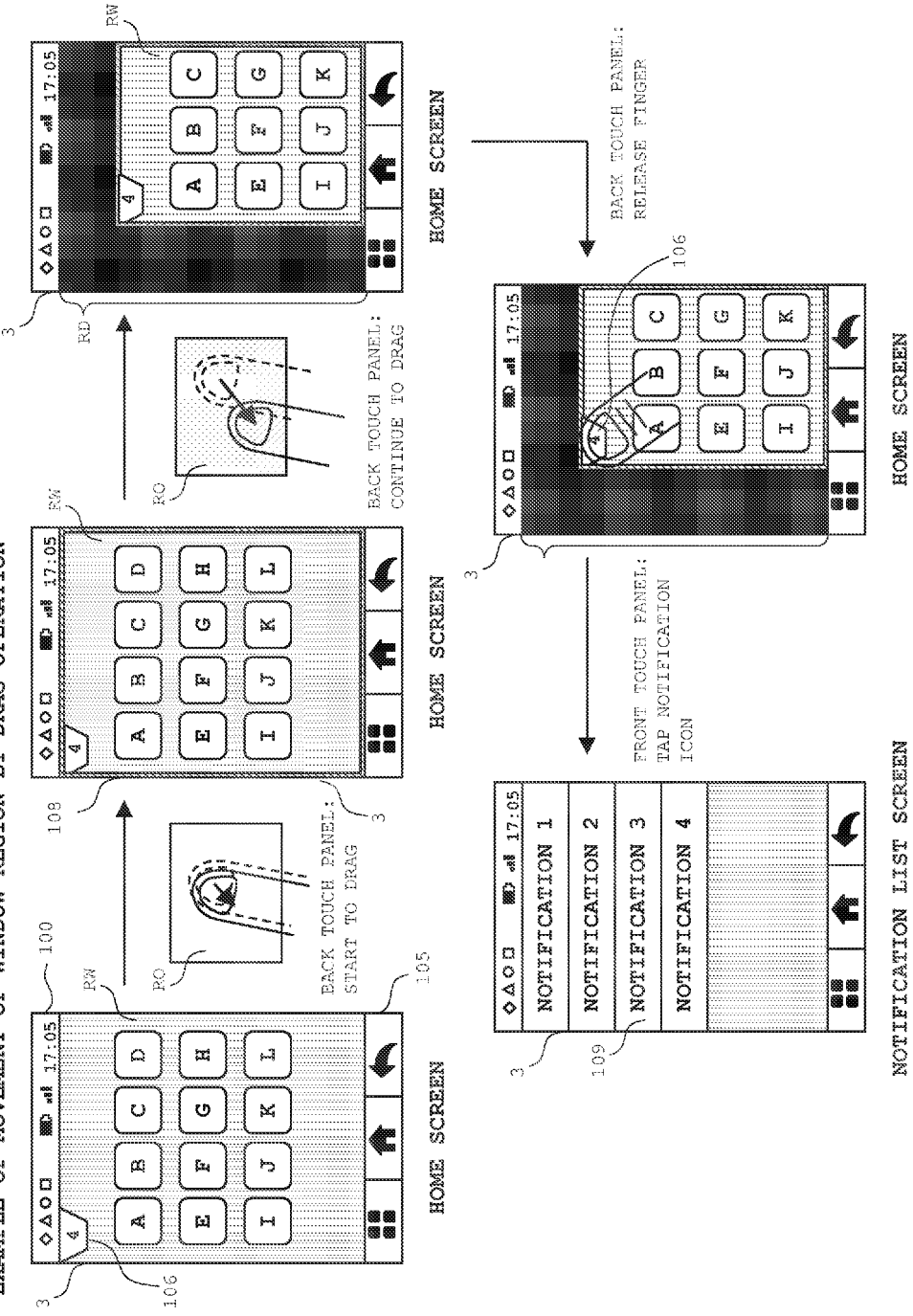

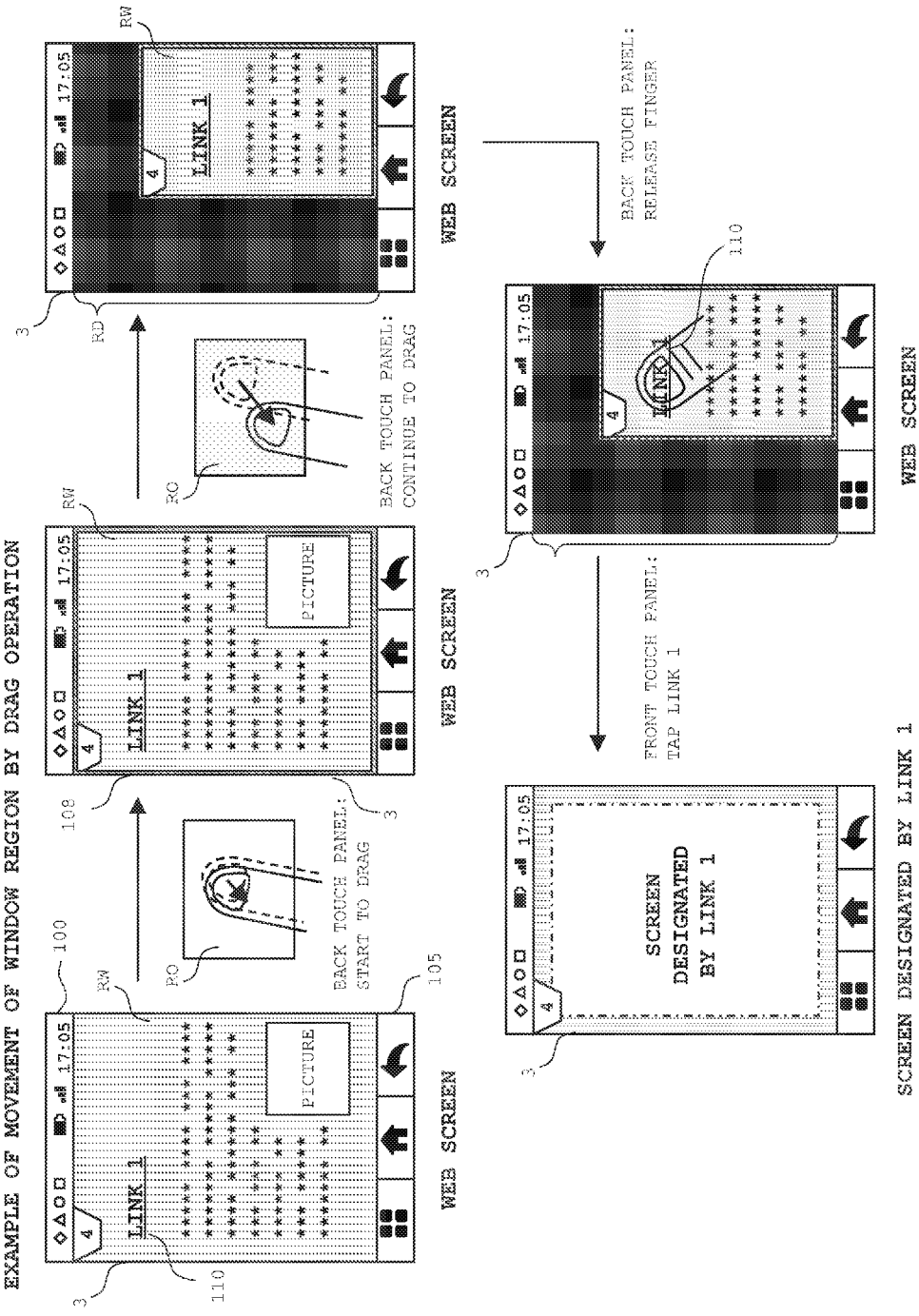

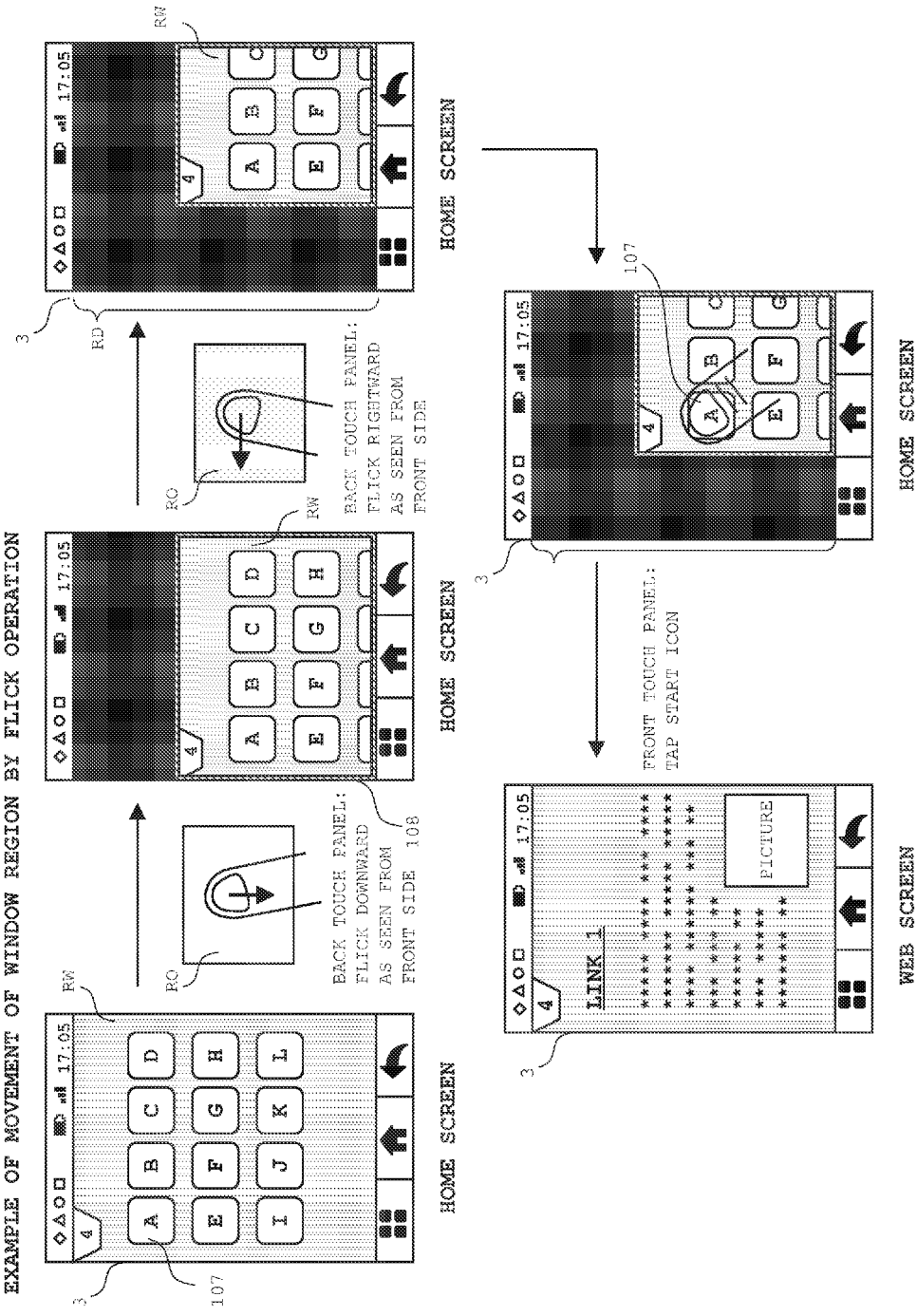

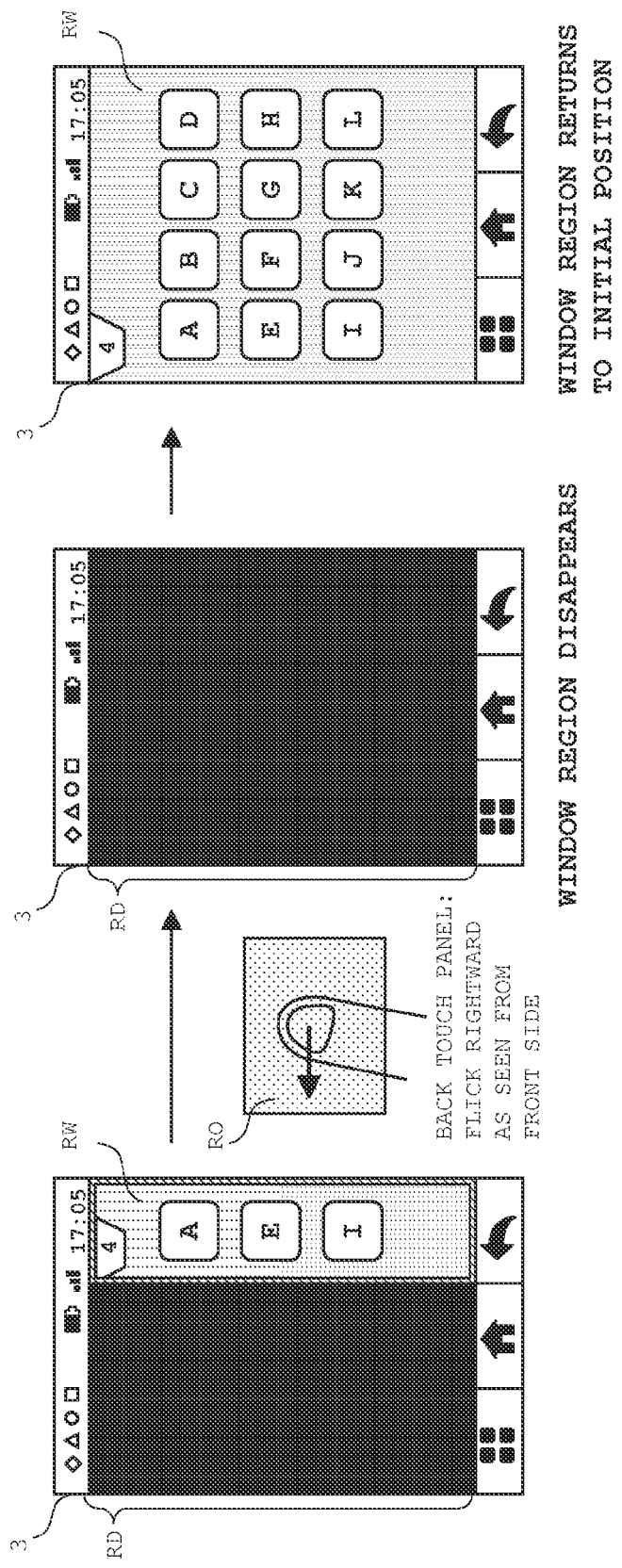

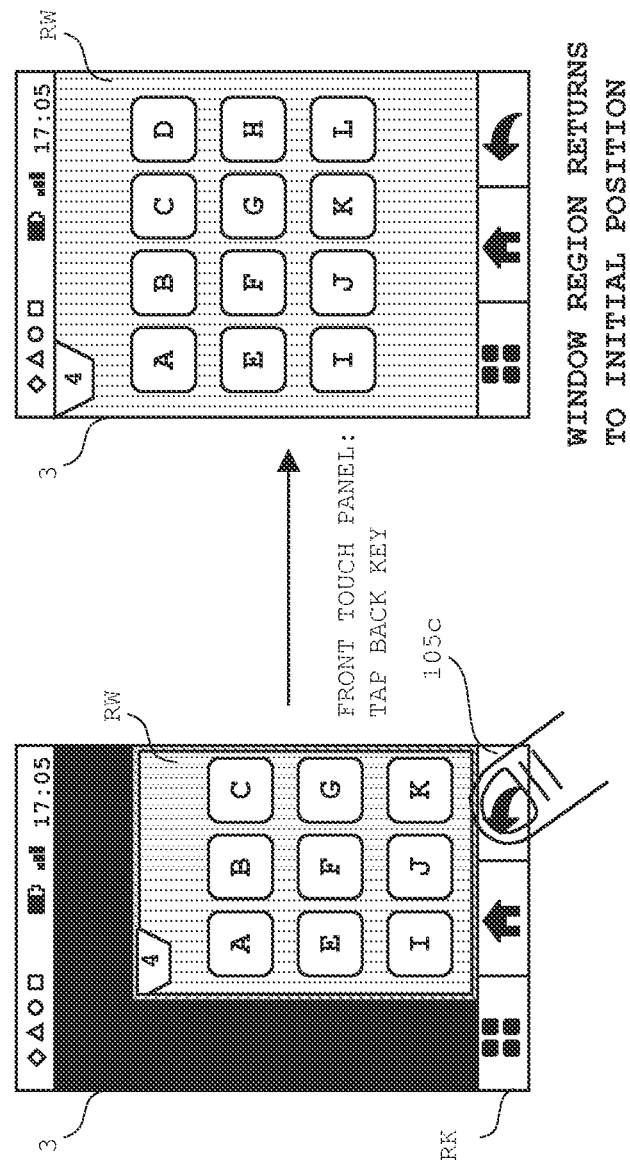

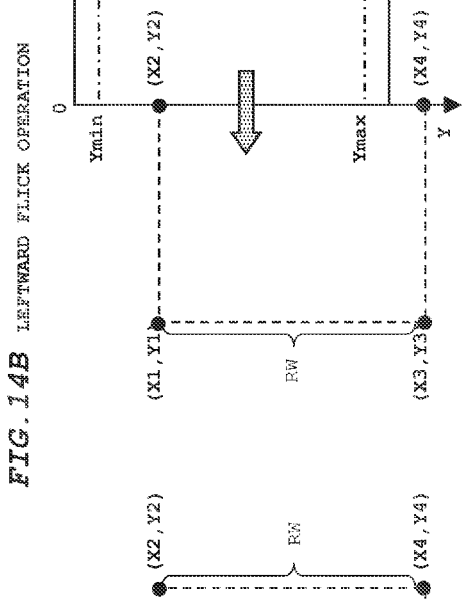
FIG. 14A RIGHTWARD FLICK OPERATION
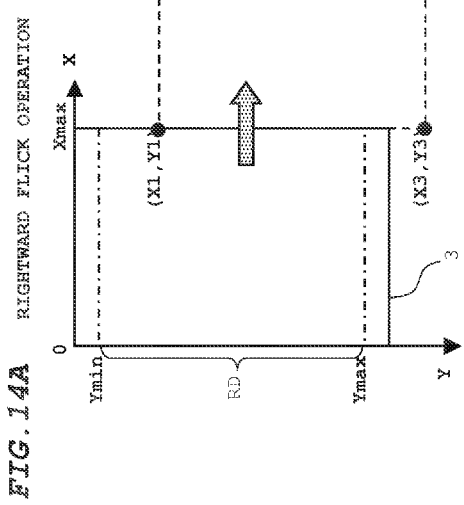
FIG. 14C DOWNWARD FLICK OPERATION
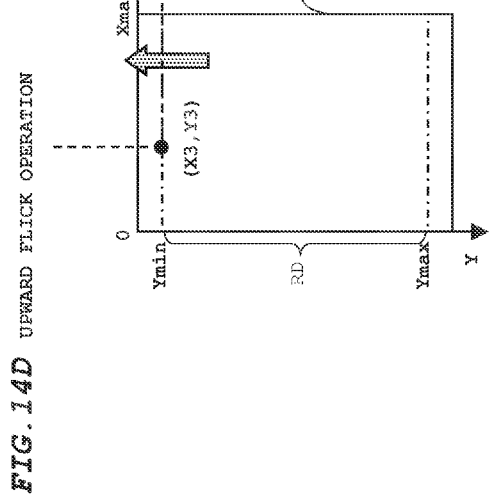
FIG. 14B LEFTWARD FLICK OPERATION
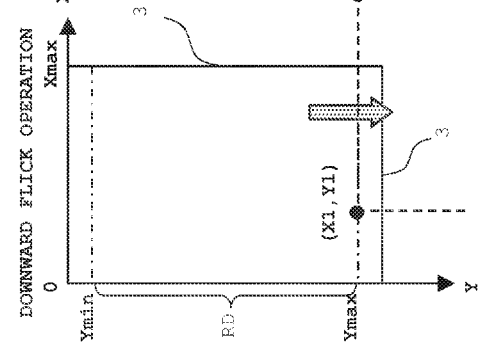
FIG. 14D UPWARD FLICK OPERATION

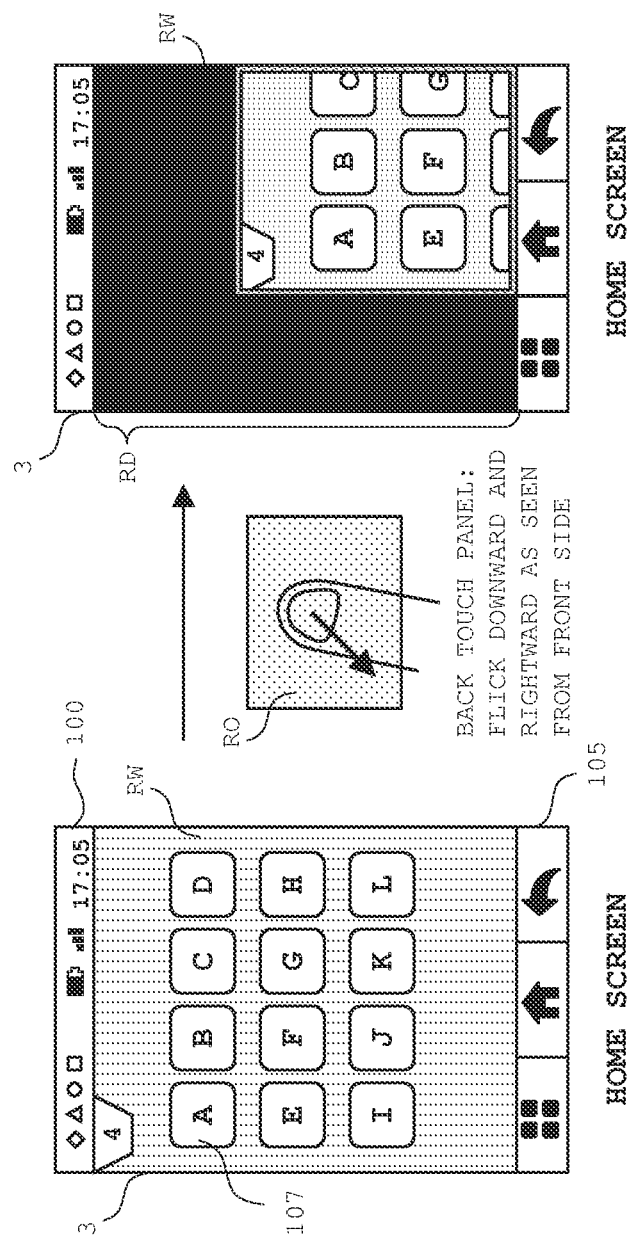

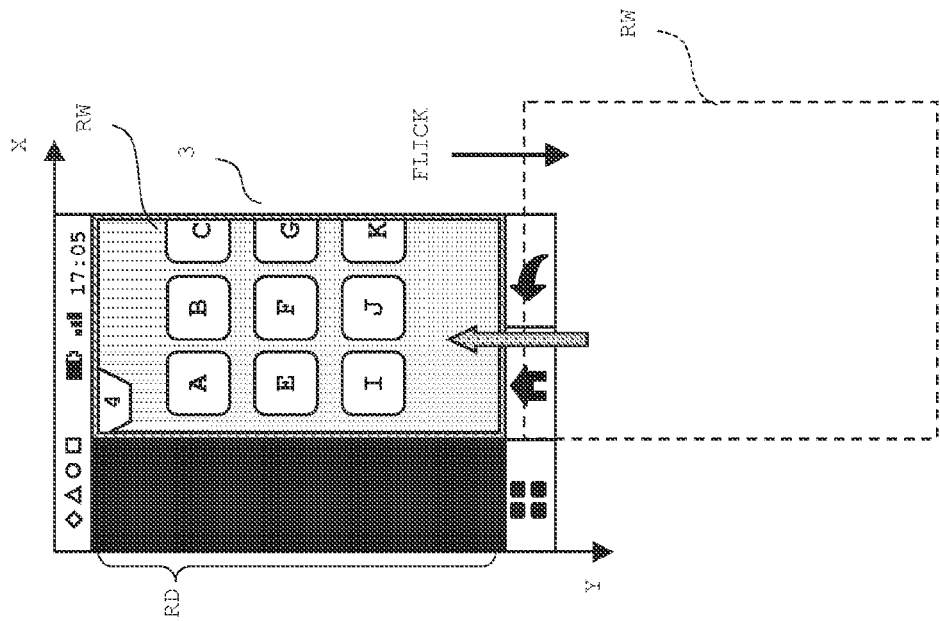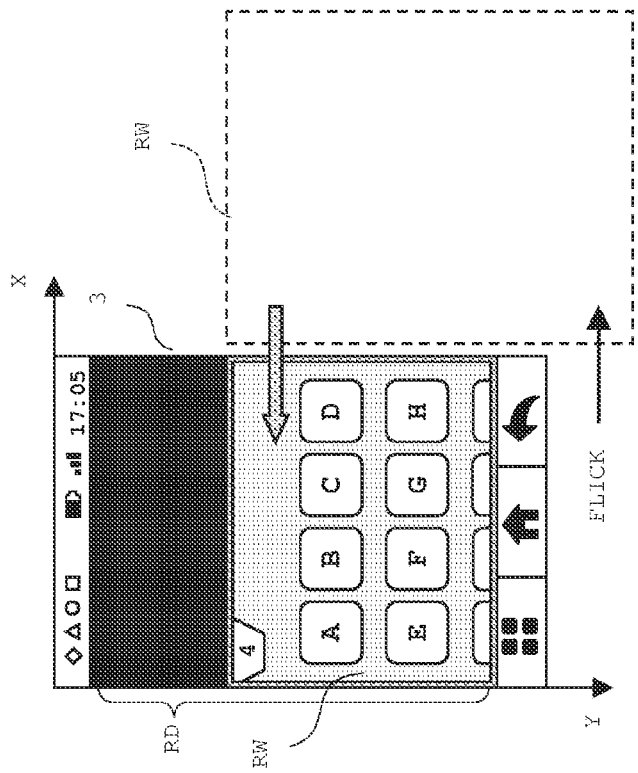

MOBILE TERMINAL DEVICE, SCREEN CONTROL METHOD, AND NON-TRANSITORY COMPUTER READABLE STORAGE MEDIUM

CROSS REFERENCE TO RELATED APPLICATION

This application is a continuation of International Application No. PCT/JP2013/084530 filed on Dec. 24, 2013, entitled "PORTABLE TERMINAL DEVICE, SCREEN CONTROL METHOD, AND PROGRAM", which claims priority under 35 U.S.C. Section 119 of Japanese Patent Application No. 2012-281785 filed Dec. 25, 2012, entitled "PORTABLE TERMINAL EQUIPMENT, SCREEN CONTROL METHOD AND PROGRAM", the disclosures of the above applications are incorporated herein by reference.

FIELD

Embodiments of the disclosure relate to mobile terminal devices such as mobile phones, personal digital assistants (PDA), tablets, and e-Readers. Embodiments of the disclosure also relate to a screen control method suitably used for such mobile terminal devices, and a non-transitory computer readable storage medium suitably used for such mobile terminal devices.

BACKGROUND

Conventionally, there is known a mobile phone in which a display is disposed on the front surface side of the casing. In such a mobile phone, for example, an almost rectangular display slightly smaller than the casing is disposed on the front surface side of the casing with an almost rectangular outline. In addition, a touch panel is disposed to overlap the display to allow various application programs (hereinafter, referred to simply as "applications") to be executed according to a user's touch operation on the display.

SUMMARY

A mobile terminal device and methods are disclosed. A casing has a plurality of surfaces. A display module is provided on a first surface of the casing and displays a screen including an object. A first detection module is provided to overlap at least part of the display module and detects an operation performed on the display module. A second detection module is provided on a second surface opposite to the first surface and detects a movement operation for moving the screen. A control module cuts out at least a partial region including the object from the screen and moves the cut region according to the movement operation, when the movement operation has been detected.

In one embodiment, a screen control method includes displaying a screen including an object on a display module provided on a first surface of a casing. Then the method includes determining whether a movement operation for moving the screen has been performed on a second surface opposite to the first surface. Then the method includes cutting out at least a partial region including the object from the screen and moves the cut region according to the movement operation, when the movement operation has been detected.

BRIEF DESCRIPTION OF THE DRAWINGS

FIGS. 4A and 4B are diagrams illustrating an example of screen transitions in the case where a process according to a touch operation on the display is performed in an embodiment;

FIG. 5 is a diagram illustrating an example of movement of a window region caused by a drag operation in an operational region in an embodiment;

FIG. 6 is a diagram illustrating an example of movement of the window region caused by a drag operation in the operational region in an embodiment;

FIG. 7 is a diagram illustrating an example of movement of the window region by a drag operation in the operational region in an embodiment;

FIG. 8 is a diagram illustrating an example of movement of the window region caused by a flick operation in the operational region in an embodiment;

FIG. 9 is a diagram illustrating an example of return of the window region to the initial position caused by repeating a flick operation in an embodiment;

FIG. 10 is a diagram illustrating an example of return of the moved window region to the initial position caused by operating a back key in an embodiment;

FIGS. 14A to 14D are diagrams describing determination on disappearance of the window region in an embodiment;

FIG. 15 is a diagram describing a mobile phone in a modification example 1;

FIGS. 16A and 16B are diagrams describing a mobile phone in a modification example 2;

The drawings are merely intended for description and do not limit the scope of the disclosure.

DETAILED DESCRIPTION

Figure 1:
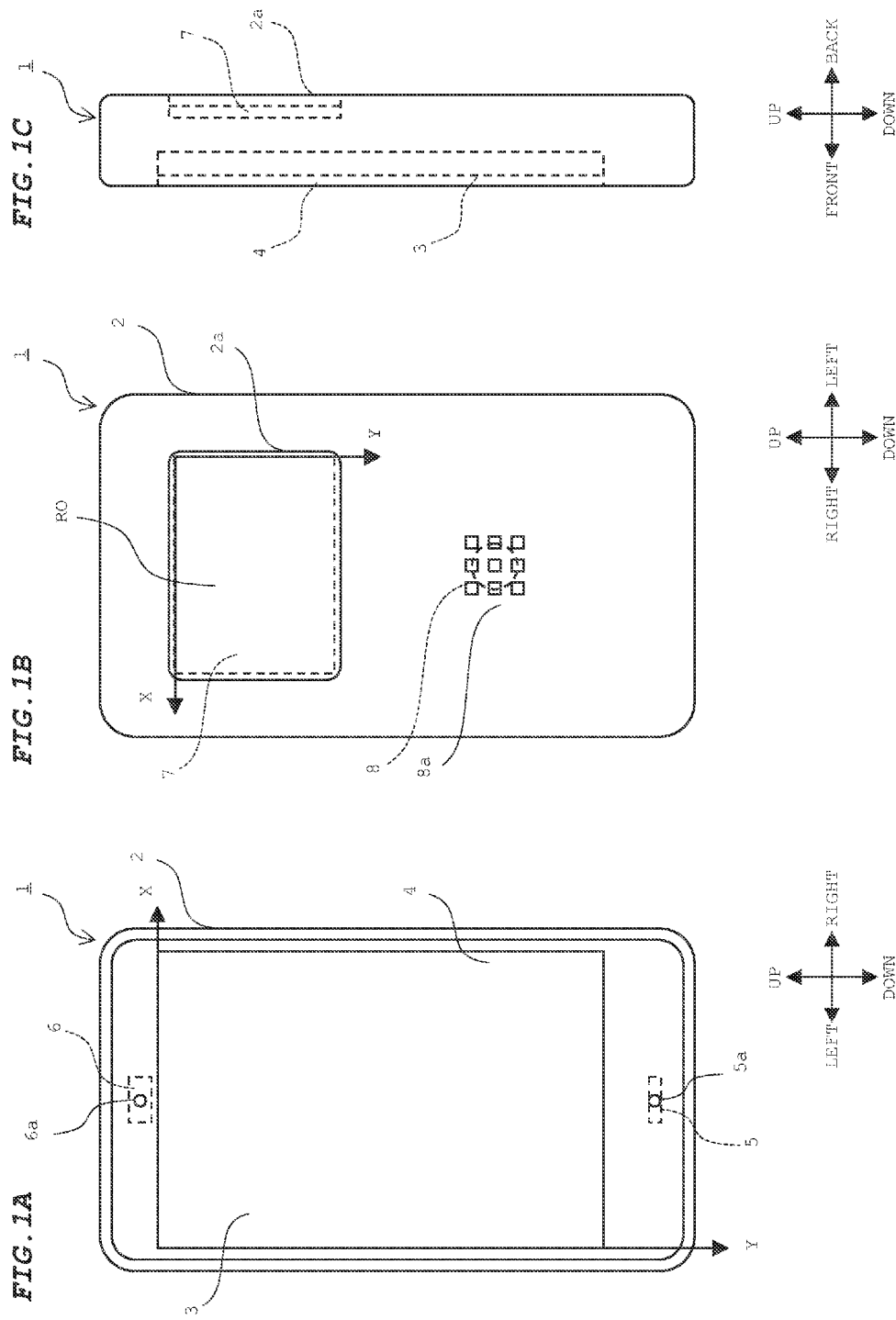
FIG. 1A to 1C are diagrams illustrating a configuration of a mobile phone in an embodiment.

FIGS. 1A, 1B, and 1C are a front view, a rear view, and a right side view of a mobile phone 1, respectively. In the following description, for the sake of convenience, directions along the long side of a housing 2 is defined as upward and downward direction, and direction along the short side of the housing 2 is defined as rightward and leftward direction as illustrated in FIGS. 1A to 1C.

As illustrated in FIGS. 1A to 1C, the mobile phone 1 may include the housing 2, a display 3, a front touch panel 4, a microphone 5, a call speaker 6, a back touch panel 7, and an external speaker 8.

The housing 2 may have a substantially rectangular outline as seen from the front side. The display 3 may be disposed on the front surface side of the housing 2. Various images may be displayed on the display 3. The display 3 can be a liquid crystal display or any other kind of a display such as an organic electroluminescent (EL) display. The front touch panel 4 may be disposed to cover the display 3. The front touch panel 4 may be formed like a transparent sheet. The front touch panel 4 can be any one of various types of touch panels such as electrostatic capacitive type, ultrasonic type, pressure sensitive type, resistive film type, and photosensitive type.

The microphone 5 may be disposed at the lower end in the housing 2. In addition, the call speaker 6 may be disposed at the upper end in the housing 2. The microphone 5 accepts sound through a microphone hole 5a in the front surface of the housing 2. The microphone 5 generates an electrical signal corresponding to the input sound. The call speaker 6 outputs sound. The output sound is emitted to the outside of the housing 2 through an output hole 6a in the front surface of the housing 2. During a call, the sound received from the communication partner's device, such as another mobile phone or the like, is output from the call speaker 6, while the sound emitted by the user is input into the microphone 5. "sound" includes various kinds of sound such as voice, ringtones, alarms, and the like.

The housing 2 may have in the back surface a concave portion 2a with an almost rectangular outline. The back touch panel 7 may be disposed on the back surface of the concave portion 2a. The bottom surface of the concave portion 2a constitutes an operational region RO in which the user usually performs operations. The user usually performs touch operations with an index finger in the operational region RO. The back touch panel 7 may be formed like a transparent sheet as the front touch panel 4 is. The back touch panel 7 may be any one of various types of touch panels such as electrostatic capacitive type, ultrasonic type, pressure sensitive type, resistive film type, and photosensitive type.

The external speaker 8 may be disposed in the housing 2. Output holes 8a are formed in the back surface of the housing 2 in correspondence with the external speaker 8. The sound output from the external speaker 8 is emitted to the outside through the output holes 8a.

Figure 2:
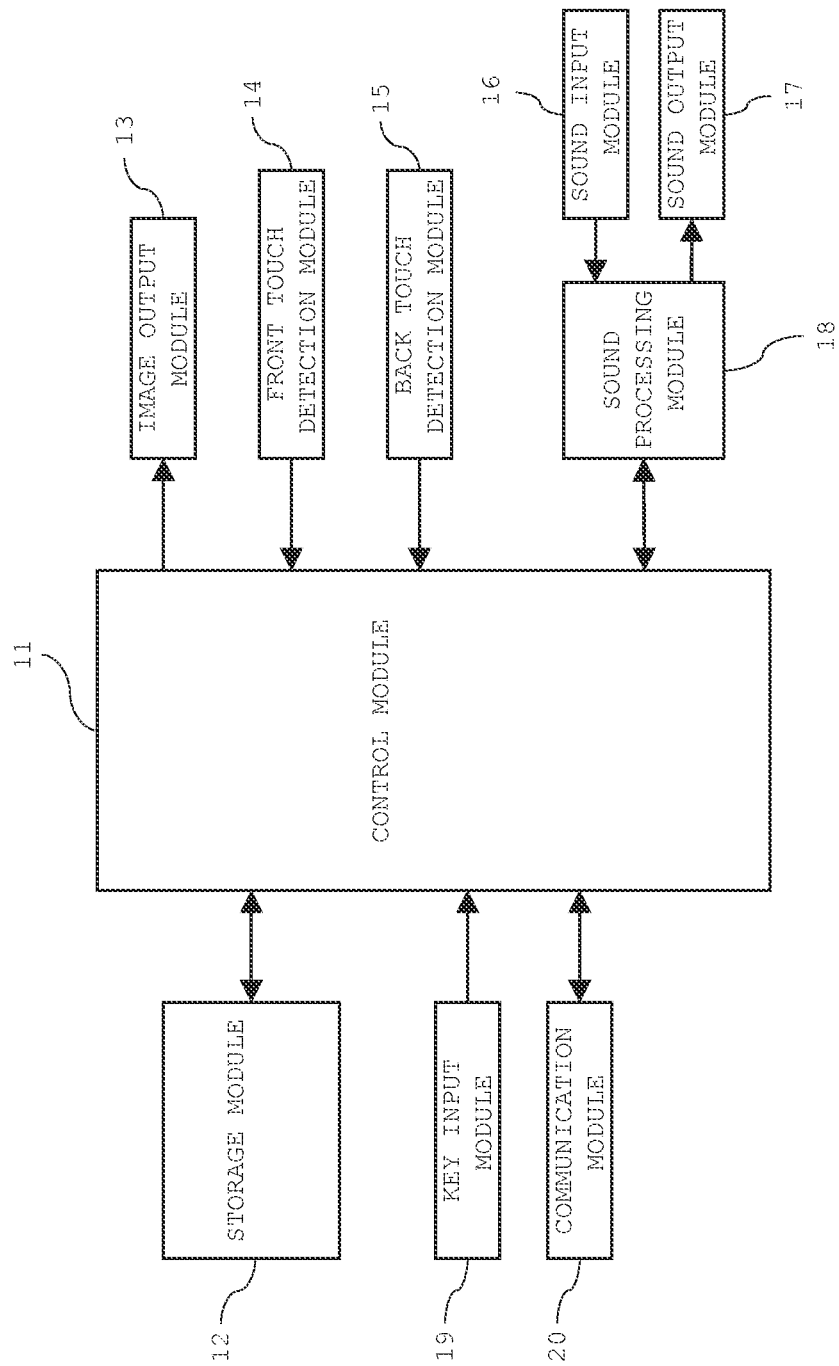
FIG. 2 is a block diagram illustrating the entire configuration of the mobile phone in an embodiment.

FIG. 2 is a block diagram illustrating the entire configuration of the mobile phone 1.

As illustrated in FIG. 2, the mobile phone 1 may include a control module 11, a storage module 12, an image output module 13, a front touch detection module 14, a back touch detection module 15, a sound input module 16, a sound output module 17, a sound processing module 18, a key input module 19, and a communication module 20.

The storage module 12 may include a ROM, a RAM, an external memory, and the like. The storage module 12 stores various programs. The programs stored in the storage module 12 include a control program for controlling the modules in the mobile phone 1, and various applications such as applications for home, phone, email, web browser, map, games, schedule management, and others. The programs may be stored in the storage module 12 when the mobile phone 1 is produced by the manufacturer, or may be stored in the storage module 12 by the user via a communication network or a storage medium such as a memory card or a CD-ROM.

The storage module 12 may also include a working area for storing data temporarily used or generated at execution of programs.

The control module 11 may include a CPU. The control module 11 controls the modules constituting the mobile phone 1, such as the storage module 12, the image output module 13, the front touch detection module 14, the back touch detection module 15, the sound input module 16, the sound output module 17, the sound processing module 18, the key input module 19, the communication module 20, and others in accordance with the programs stored in the storage module 12.

The image output module 13 may include the display 3 illustrated in FIG. 1A. The image output module 13 displays an image on the display 3, based on a control signal and an image signal from the control module 11.

The front touch detection module 14 may include the front touch panel 4 illustrated in FIG. 1A. The front touch detection module 14 detects by the front touch panel 4 the user's touch operation on the display 3. Specifically, when the user has touched a region on the display 3, the front touch detection module 14 detects the position touched by the user on the display 3 (hereinafter, referred to as "touch position"). The front touch detection module 14 outputs a position signal corresponding to the detected touch position to the control module 11. As illustrated in FIG. 1A, an orthogonal coordinate system is set on the display 3 with an origin point at the upper left corner of the display 3, an X axis along the rightward and leftward directions, and a Y axis in the upward and downward directions, for example. When the display 3 is touched by the user's finger, the front touch panel 4 outputs coordinate values indicative of the touch position on the display 3.

Proving the front touch panel 4 allows the user to perform various touch operations by touching the display 3 with a finger. Examples of the touch operations include a tap operation, a flick operation, a slide operation, and a drag operation, and others. The tap operation is an operation of touching the display 3 with a finger, and then releasing the finger from the display 3 within a short time. The flick operation is an operation of touching the display 3 with a finger, and then flipping the display 3 with a finger in an arbitrary direction. The slide operation is an operation of holding a finger in contact with the display 3 and moving the finger in an arbitrary direction. The drag operation is an operation of performing a slide operation on a target object to be moved, such as an icon, a window region described later or the like and then releasing the finger from the display 3. The flick operation, the slide operation, and the drag operation are touch operations with movement of a touch position.

For instance, after detection of a touch position, when the front touch detection module 14 has not detected the touch position any more within a predetermined first time, the control module 11 determines that the touch operation is a tap operation. After detection of a touch position, when the touch position has been moved by a predetermined first distance or more within a predetermined second time and then the touch position has not been detected any more, the control module 11 determines that the touch operation is a flick operation. After detection of a touch position, when the touch position has been moved by a predetermined second distance or more, the control module 11 determines that the touch operation is a slide operation.

The back touch detection module 15 may include the back touch panel 7 illustrated in FIG. 1B. The back touch detection module 15 detects by the back touch panel 7 the user's touch operation in the operational region RO illustrated in FIG. 1B. Specifically, when the user touches the operational region RO, the back touch detection module 15 uses the back touch panel 7 to detect the touch position. The back touch detection module 15 outputs a position signal generated according to the detected touch position to the control module 11. As illustrated in FIG. 1B, an orthogonal coordinate system is set on the operational region RO with an origin point at the upper right corner of the operational region RO, an X axis along the rightward and leftward directions, and a Y axis along the upward and downward directions, for example, such that, when the mobile phone 1 is seen from the front side, the orthogonal coordinate system on the operational region RO is aligned with the orthogonal coordinate system on the display 3 in the positive and negative directions of the X axis and the positive and negative directions of the Y axis. When the operational region RO is touched with a finger, the back touch panel 7 outputs coordinate values indicative of the touch position in the operational region RO.

The sound input module 16 may include the microphone 5. The sound input module 16 outputs an electrical signal from the microphone 5 to the sound processing module 18.

The sound output module 17 may include the call speaker 6 and the external speaker 8. Electrical signal from the sound processing module 18 is input into the sound output module 17. The sound output module 17 outputs sound from the call speaker 6 or the external speaker 8.

The sound processing module 18 performs A/D conversion or the like on the electrical signal from the sound input module 16, and outputs a converted digital sound signal to the control module 11. The sound processing module 18 performs decoding, D/A conversion, or the like on the digital sound signal from the control module 11, and outputs a converted electrical signal to the sound output module 17.

The key input module 19 may include at least one hardware key. For example, the key input module 19 includes a power key for powering on the mobile phone 1 and others. When any of the various hardware keys (not illustrated) disposed on the mobile phone 1 is pressed, the key input module 19 outputs a signal corresponding to the pressed hardware key to the control module 11.

The communication module 20 may include a circuit for converting signals, a radio wave transmission/reception antenna, and the like for calls or telecommunications. The communication module 20 converts the signals for calls or telecommunications from the control module 11 into radio signals, and transmits the radio signals via the antenna to a base station or another destination such as a communication device. The communication module 20 further converts radio signals received via the antenna into signals in a form usable by the control module 11, and outputs the converted signals to the control module 11.

Figure 3:
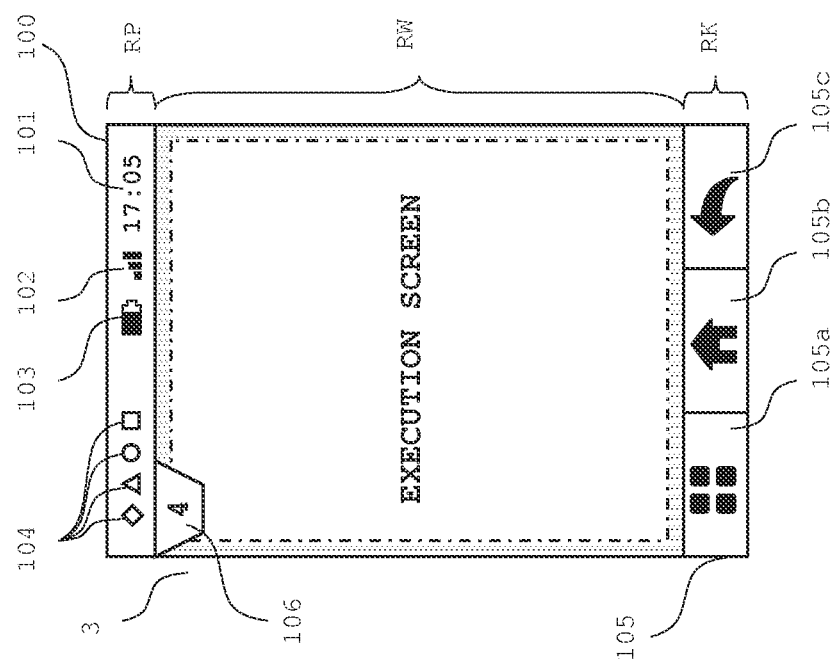
FIG. 3 is a diagram describing a screen displayed on a display by execution of an application in an embodiment.

FIG. 3 is a diagram describing a screen displayed on the display 3 by execution of an application. The control module 11 executes various applications as described above. After execution of an application, the control module 11 performs a process according to the user's touch operation on the display 3, and displays on the display 3 a screen based on the process.

As illustrated in FIG. 3, the screen displayed on the display 3 includes a pictogram region RP, a window region RW, and a key region RK. The pictogram region RP provides a notification bar 100. The notification bar 100 includes a present time 101, a battery meter 102 indicative of remaining battery power, an intensity meter 103 indicative of electric field intensity, and the like. The notification bar 100 also includes notification icons 104 corresponding to notification information to be notified to the user other than the present time 101, the battery meter 102, and the intensity meter 103. The other notification information may include information on missed incoming calls (phone numbers, callers' names, and others), information on incoming emails (email addresses, senders' names, and others), information indicating a lapse of an alarm time, information indicative of a lapse of a scheduled time, information on updates of the mobile phone 1, information indicating that an external memory is connected to the mobile phone 1, and others. The user can view the notification bar 100 to check roughly the notification information.

The key area RK provides an operation key group 105. The operation key group 105 includes a set key 105a, a home key 105b, and a back key 105c. The set key 105a is intended to display set screens for making various settings on the display 3. The home key 105b is intended to shift a currently displayed screen to a home screen on the display 3. The back key 105c is intended to return from a currently executed process to the previous process.

The window region RW includes a screen to be displayed upon execution of an application. For example, when a home application is executed, the home screen is displayed in the window region RW. Start icons for starting various applications for phone, email, and others are arranged on the home screen. When an application for phone is executed, a dial screen, an incoming call list screen, or the like is displayed in the window region RW. When an application for web browser is executed, a web screen is displayed in the window region RW based on data acquired from an external server.

The window region RW includes a notification tag 106 regardless of an executed application. For example, the notification tag 106 is arranged at the left corner of the window region RW. The user can operate the notification tag 106 to check detailed contents of notification information displayed in the notification bar 100. The number indicated in the notification tag 106 denotes the number of pieces of notification information with detailed contents to be displayed.

Depending on an executed application, at least one of the pictogram region RP and the key region RK may not be displayed. In this case, the window region RW may extend to the pictogram region RP or the key region RK. That is, the entire screen may be occupied by the window region RW. For example, in the case where the pictogram region RP is not to be displayed, the screen to be displayed upon execution of an application may occupy the window region RW and the pictogram region RP. In the case where the key region RK is not to be displayed, the screen to be displayed upon execution of an application may occupy the window region RW and the key region RK. In the case where both the pictogram region RP and the key region RK are not to be displayed, the screen to be displayed upon execution of an application may occupy the window region RW, the pictogram region RP, and the key region RK. In an embodiment, in the case where the screen is displayed to occupy the window region RW and the key region RK, the two regions may be referred to collectively as window region RW. In the case where the screen is displayed to occupy the window region RW and the pictogram region RP, the two regions may be referred to collectively as window region RW. In the case where the screen is displayed to occupy the window region RW, the pictogram region RP, and the key region RK, the three regions may be referred to collectively as window region RW.

FIGS. 4A and 4B are diagrams illustrating an example of screen transitions in the case where a process according to a touch operation on the display 3 is performed.

When detecting a tap operation on the home key 105b, the control module 11 executes the home application to display the home screen on the display 3. The home screen provides an arrangement of start icons 107 for starting various applications. For example, as illustrated in FIG. 4A, when a tap operation has been performed by the user on the start icon 107 for phone application, the phone application is started and a dial screen for making a call by entry of a phone number is displayed on the display 3.

As illustrated in FIG. 4B, the home screen includes a plurality of pages. For example, in the case where the pages are continued to the left, when a rightward flick operation has been performed on the home screen at any position, the home screen is scrolled to display the next page on the display 3. The plurality of pages may be ranked. For example, when detecting a flick operation while any screen is displayed, the control module 11 may select according to the flick operation one of the screens associated with the ranks preceding and following the rank assigned to the screen on which the flick operation has been performed, and display the selected screen on the display 3.

Figure 18:
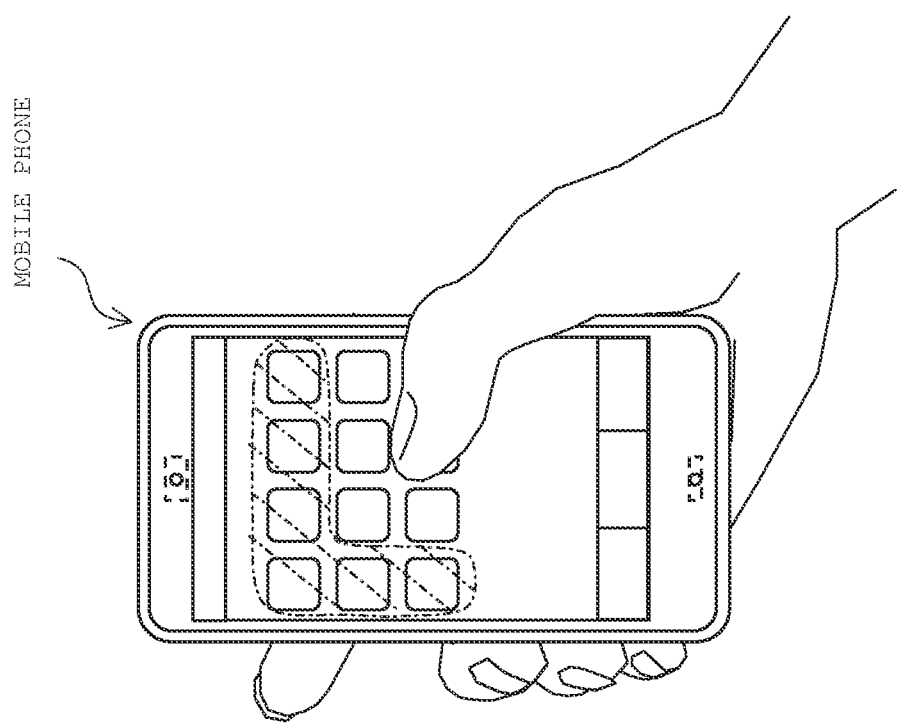
FIG. 18 is a diagram illustrating a state of a user's operation on a mobile phone.

In many cases, a user holds the mobile phone 1 with one hand and performs a touch operation on the display 3 with the thumb of the hand. As illustrated in FIG. 18, in recent years, mobile phone displays have been upsized. Accordingly, when performing an operation on such a mobile phone with a thumb, a user may have difficulty in reaching an area of the display from the top to the side opposite to the side in contact with the base of the thumb, as indicated with dotted lines in FIG. 18. Thus, the user has to change his/her way to hold the mobile phone when an object such as the start icon 107 is placed at a position where the thumb is hard to reach and the user wishes to perform a touch operation on the object.

To save the user from having to change frequently his/her way to hold the mobile phone 1, the mobile phone 1 in an embodiment includes a screen movement function by which the user can move the window region RW over the display 3 by performing a drag operation or a flick operation in the operational region RO on the back surface of the housing 2.

The screen movement function will be described below with reference to FIGS. 5 to 10.

FIGS. 5 to 7 illustrate examples of movement of the window region RW by a drag operation in the operational region RO.

FIG. 5 illustrates an example in which the user moves the home screen and operates the start icon 107 for web browser to start the web browser.

While the home screen is displayed on the display 3, when the user wishes to move the distant start icon 107 close to the thumb, the user performs a drag operation in the operational region RO with an index finger to move the start icon 107 toward the desired direction. That is, the user performs a drag operation in the same direction as the direction in which the start icon 107 is to be moved as the mobile phone 1 is seen from the front side. For example, when wishing to move the home screen in the downward and rightward direction, the user moves the index finger in the downward and rightward direction as the mobile phone 1 is seen from the front side. As illustrated in FIG. 5, as the mobile phone 1 is seen from the back side, the user moves the index finger in the downward and leftward direction. In this embodiment, for the sake of convenience, the direction of a drag operation in the operational region RO is described as the mobile phone 1 is seen from the front side.

When the drag operation is started, a frame 108 of a predetermined color (for example, red) is formed at the circumference of the home screen (window region RW). This allows the user to recognize that the home screen has entered a movement mode in which the window region RW is moved.

The display 3 provides a window display region RD in which the window region RW is displayed. When the user continues to perform a drag operation, the home screen (window region RW) moves within the window display region RD, following the drag operation, in the same direction as the direction of the drag operation as the mobile phone 1 is seen from the front side. For example, when the user has performed a downward and rightward drag operation, the window region RW moves in the downward and rightward direction. In this example, the portion of the window region RW lying off the window display region RD after the movement is not displayed on the display 3. The portion of the window display region RD without the window region RW after the movement is displayed in black due to the absence of an image to be displayed. The portion may be displayed in any color other than black.

Even when the window region RW is moved by a drag operation in the operational region RO, the notification bar 100 in the pictogram region RP and the operation key group 105 (the set key 105a, the home key 105b, and the back key 105c) in the key region RK are not moved.

When the user has released the finger from the operational region RO, the home screen is held at the position after the movement. When the desired start icon 107 has come close to the thumb, the user performs a tap operation on the start icon 107 with the thumb. Accordingly, the application corresponding to the tapped start icon 107 is started. For example, when the user has performed a tap operation on the start icon 107 for web browser, the web browser is started and the web screen is displayed on the display 3.

When the user has performed a tap operation on the back key 105c, the home application is started again and the home screen is displayed on the display 3. At that time, the home screen (window region RW) is arranged at an initial position. The initial position refers to a position in which the window region RW is arranged before the movement by a drag operation or a flick operation in the operational region RO.

FIG. 6 illustrates an example in which the user moves the home screen and operates the notification tag 106 to display a notification list screen on the display 3.

While the home screen is displayed on the display 3, when the user wishes to view detailed contents of the notification information in the pictogram region RP, the user needs to operate the notification tag 106. Since the notification tag 106 is arranged at the upper right corner of the home screen, the user's thumb is hard to reach the notification tag 106. Thus, the user performs a drag operation in the operational region RO to move the notification tag 106 close to the thumb. As in the example of FIG. 5, the home screen moves within the window display region RD. The notification tag 106 moves together with the home screen. When the notification tag 106 has come close to the thumb, the user releases the finger from the operational region RO and performs a tap operation on the notification tag 106 with the thumb. Accordingly, the notification list screen with a list of various types of notification information 109 is displayed on the display 3.

FIG. 7 illustrates an example in which, while the web screen is displayed on the display 3 by starting the web browser, the user moves the web screen and operates a link image 110 with a hyperlink to display a screen designated by the link image 110 on the display 3.

The web screen displayed on the display 3 may include the link image 110 (a character string, a photograph, or the like) with a hyperlink. When the link image 110 is distant from the user's thumb, the user performs a drag operation in the operational region RO to move the link image 110 close to the thumb. Following the drag operation, the web screen moves within the window display region RD. When the link image 110 has come close to the thumb, the user releases the finger from the operational region RO, and performs a tap operation on the link image 110 with the thumb. Accordingly, the screen designated by the link image 110 is displayed on the display 3.

FIG. 8 is a diagram illustrating an example of movement of the window region RW caused by a flick operation in the operational region RO. In the example of FIG. 8, the user moves the home screen and operates the start icon 107 for web browser to start the web browser.

The user can also move the home screen (window region RW) by performing a flick operation in the operational region RO in the upward, downward, rightward, and leftward directions. As illustrated in FIG. 8, when the user performs a downward flick operation in the operational region RO, the window region RW is moved downward by a predetermined amount within the window display region RD and is held at a position after the movement. When the user performs a rightward flick operation in the operational region RO as the mobile phone 1 is seen from the front side, that is, when the user performs a leftward flick operation as the mobile phone 1 is seen from the back side as illustrated in FIG. 8, the window region RW is moved rightward in the window display region RD by a predetermined amount and is held at a position after the movement. For example, the predetermined amount of movement in the upward and downward directions is set to a length of ⅓ of longitudinal side of the window display region RD, and the predetermined amount of movement in the rightward and leftward directions is set to a length of ⅓ of the lateral side of the window display region RD. In the following description of this embodiment, for the sake of convenience, the direction in which a flick operation is performed in the operational region RO will be referred to as the direction as the mobile phone 1 is seen from the front side.

FIG. 9 is a diagram illustrating an example of return of the window region RW to the initial position caused by repeating a flick operation.

In the case where the window region RW is to be moved by one flick operation by the length of ⅓ of the window display region RD in any of the upward, downward, rightward, and leftward directions as described above, when three flick operations have been performed in one direction, the window region RW disappears from the window display region RD. When the window region RW has disappeared from the window display region RD by the flick operations as described above, the window region RW returns to the initial position. The window region RW may return immediately to the initial position or may gradually move and return to the initial position.

FIG. 10 is a diagram illustrating an example of return of the moved window region RW to the initial position caused by operating the back key 105c.

When a tap operation has been performed on the back key 105c, the window region RW returns to the initial position. The window region RW may return immediately to the initial position or may gradually move and return to the initial position. In an embodiment, further, after the movement of the window region RW, when a predetermined period of time has elapsed with no touch operation performed on the display 3 or the operational region RO, the window region RW returns to the initial position as in the case where the back key 105c has been operated.

The screen movement function is achieved by a screen control process executed by the control module 11.

Figure 11:
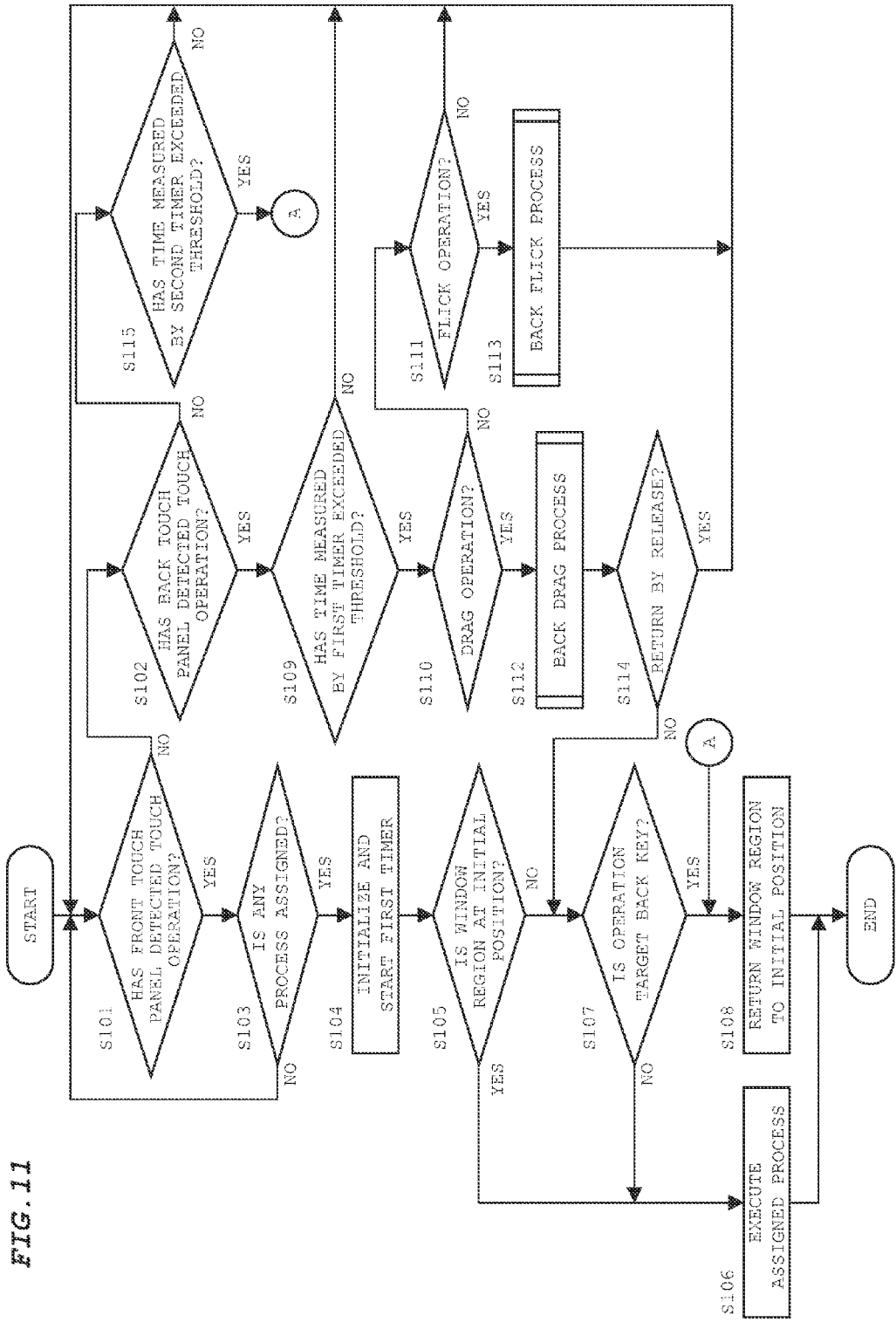
FIG. 11 is a flowchart of a screen control process in an embodiment.

FIG. 11 is a flowchart of the screen control process. The screen control process will be described below in detail.

While the screen is displayed on the display 3, the control module 11 monitors whether the front touch panel 4 has detected a touch operation and whether the back touch panel 7 has detected a touch operation (S101, S102).

When determining that the front touch panel 4 has detected a touch operation (S101: YES), the control module 11 determines whether any process is assigned to the detected touch operation (S103). When any process is assigned to the detected touch operation (S103: YES), the control module 11 initializes (resets) and starts a first timer (S104). The first timer is provided in the control module 11, for example.

Next, the control module 11 determines whether the window region RW is currently located at the initial position (S105). When determining that the window region RW is currently located at the initial position (S105: YES), the control module 11 executes the process assigned to the detected touch operation such as starting of an application (S106).

In contrast, when determining that the window region RW is not located at the initial position, that is, the window region RW is moving or located at a position after movement (S105: NO), the control module 11 determines whether the touch operation has been performed on the back key 105c (S107). When the touch operation has not been performed on the back key 105c (S107: NO), the control module 11 executes the process assigned to the detected touch operation (S106). When the touch operation has been performed on the back key 105c (S107: YES), the control module 11 returns the window region RW to the initial position (S108). After completion of the process at step S106 or S108, the screen control process is temporarily stopped and then is started again. The first timer continuously operates.

When determining that the back touch panel 7 has detected a touch operation (S102: YES), the control module 11 determines whether a time measured by the first timer has exceeded a predetermined threshold (for example, one second) (S109). When the time measured by the first timer has not exceeded the threshold (S109: NO), the control module 11 invalidates the detected touch operation.

When the user has performed a touch operation on the display 3 with a thumb, the index finger next to the thumb may move in coordination with the thumb and cause an unintentional touch operation in the operational region RO. As described above, since the touch operation on the display 3 is invalidated within a predetermined period of time after a touch operation on the display 3, a wrong operation caused by the coordination of the index finger as described above can be prevented.

When the time measured by the first timer has exceeded the threshold (S109: YES), the control module 11 determines whether the detected touch operation is a drag operation and whether the detected touch operation is a flick operation (S110, S111). When the detected operation is not a drag operation or a flick operation (S111: NO), the control module 11 invalidates the detected touch operation (for example, a tap operation).

When determining that the detected touch operation is a drag operation (S110: YES), the control module 11 executes a back drag process according to the drag operation (S112). Meanwhile, when determining that the detected touch operation is a flick operation (S111: YES), the control module 11 executes a back flick process according to the flick operation (S113).

Figure 12:
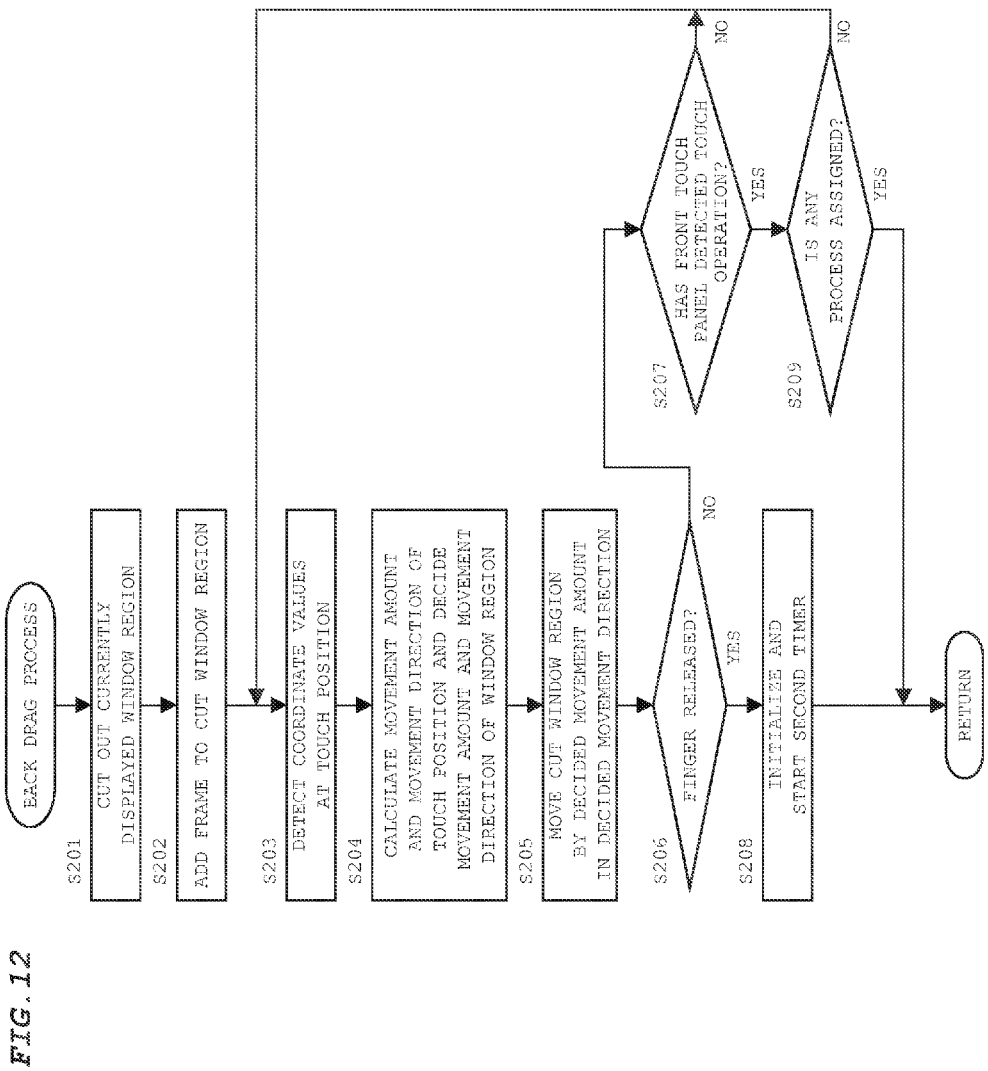
FIG. 12 is a flowchart of a back drag process in an embodiment.

FIG. 12 is a flowchart of the back drag process.

When a drag operation has been performed in the operational region RO, the control module 11 first cuts out the window region RW from the screen currently displayed on the display 3 (S201). The control module 11 adds a frame 108 to the circumference of the cut window region RW (S202). Then, the control module 11 detects coordinate values of the current touch position (S203). According to the coordinate values detected this time and the coordinate values detected at the previous time (when the this-time coordinate values have been detected firstly after the start of the back drag process, the coordinate values at the first touch position by the drag operation are applied), the control module 11 calculates the movement amount and the movement direction of the touch position, and decides the movement amount and the movement direction of the window region RW based on the calculated result (S204). In an embodiment, the operational region RO is smaller than the window display region RD. Accordingly, the control module 11 decides the value obtained by multiplying the movement amount of the touch position by a determined ratio as the movement amount of the window region RW. The movement direction of the window region RW is the same as the movement direction of the touch position in the operational region RO. Accordingly, the control module 11 decides the movement direction of the touch position as the movement direction of the window region RW.

The control module 11 moves the cut window region RW in the window display region RD of the display 3 by the decided movement amount in the decided movement direction (S205).

The control module 11 determines whether the finger has been released from the operational region RO (S206). When the detected touch position has not been detected any more, the control module 11 determines that the finger has been released. The control module 11 also determines whether the front touch panel 4 has detected a touch operation (S207). The control module 11 repeats steps S203 to S205 until the control module 11 determines that the finger has been released or the front touch panel 4 has detected a touch operation. Accordingly, following the drag operation in the operational region RO, the window region RW moves within the window display region RD of the display 3.

After moving the window region RW to the desired position, the user releases the finger form the operational region RO. When determining that the finger has been released from the operational region RO (S206: YES), the control module 11 initializes (resets) and starts a second timer (S208), and terminates the back drag process. The second timer is provided in the control module 11, for example.

The user may perform a touch operation on the display 3 before releasing the finger from the operational region RO. In such a case, when determining that the front touch panel 4 has detected a touch operation before the finger is released from the operational region RO (S207: YES) and also determining that any process is assigned to the detected touch operation (S209: YES), the control module 11 also terminates the back drag process.

Returning to FIG. 11, when the back drag process has been terminated not by the finger's release, that is, when the user has performed a touch operation on the display 3 before releasing the finger and the front touch panel 4 has detected the touch operation to terminate the back drag process (S114: NO), the control module 11 moves to step S107. When the touch operation has been performed on the back key 105*c* (S107: YES), the control module 11 returns the window region RW to the initial position (S108). When the touch operation has not been performed on the back key 105*c* (S107: NO), the control module 11 executes the process assigned to the touch operation (S106).

When the back drag process has been terminated by the finger's release (S114: YES), the control module 11 returns to step S101 to monitor whether the front touch panel 4 has detected a touch operation or the back touch panel 7 has detected a touch operation (S101, S102).

Figure 13:
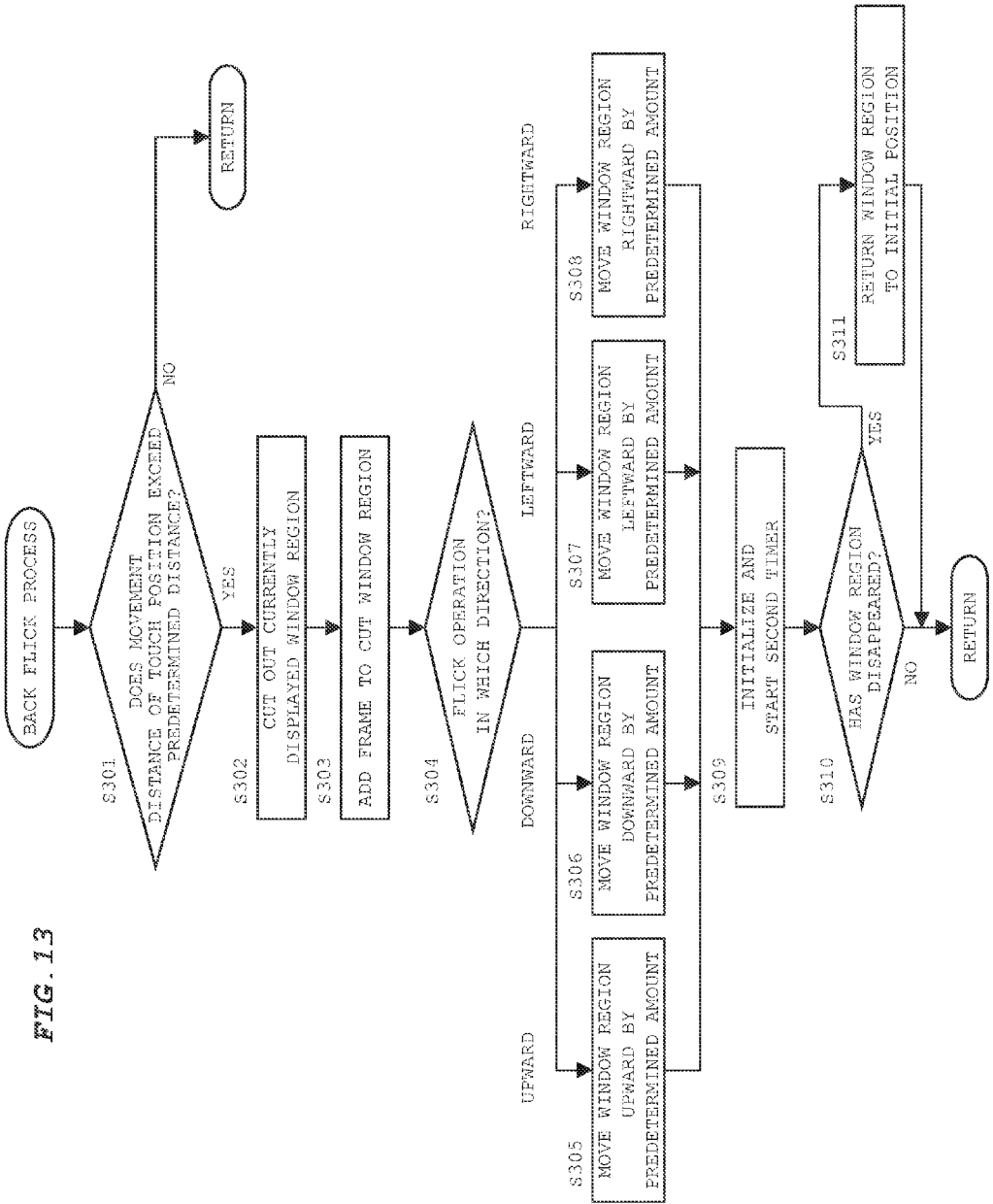
FIG. 13 is a flowchart of a back flick operation in an embodiment.

FIG. 13 is a flowchart of the back flick operation.

When a flick operation has been performed in the operational region RO, the control module 11 determines whether the movement distance of the touch position where the flick operation has been detected exceeds a predetermined distance (S301). When the movement distance does not exceed the predetermined distance (S301: NO), the control module 11 invalidates the detected flick operation and terminates the back flick process. As described above, when a flick operation with predetermined distance is not performed in the operational region RO, the operation is not accepted to prevent the user's wrong operation.

When the movement distance exceeds the predetermined distance (S301: YES), the control module 11 cuts out the window region RW from the screen currently displayed on the display 3 (S302). The control module 11 adds the frame 108 to the circumference of the cut window region RW (S303).

Next, the control module 11 determines whether the flick operation has been performed in the upward, downward, rightward, or leftward direction as the mobile phone 1 is seen from the front side (S304). Assuming that the just rightward direction as the mobile phone 1 is seen from the front side is set as a reference direction (0 degree), for example, when the direction of the flick operation as the mobile phone 1 is seen from the front side falls within the range between 45 and 135 degrees, the range between 135 and 225 degrees, the range between 225 and 315 degrees, or the range between 315 and 45 degrees relative to the reference direction, the control module 11 determines that the upward, leftward, downward, or rightward flick operation has been performed, respectively. To eliminate a deviation from the direction of a flick operation actually performed by the user, the user may perform a just rightward flick operation in advance and the direction of the flick operation performed by the user may be set as a reference direction.

The control module 11 moves the cut window region RW by a predetermined amount in the same direction as the determined direction of the flick operation (S305, S306, S307, and S308).

The control module 11 initializes (resets) and starts the second timer (S309). The control module 11 further determines whether the window region RW has disappeared from the window display region RD by this movement of the window region RW (S310).

FIGS. 14A to 14D are diagrams for describing determination on disappearance of the window region RW. As illustrated in FIG. 14A, in the case where the window region RW is moved rightward by the rightward flick operation and the movement amount is added to a coordinate value "X1" on an X axis at the upper left corner of the window region RW before the movement or a coordinate value "X3" on the X axis at the lower left corner of the window region RW before the movement, when the coordinate value "X1" or "X3" after the movement reaches a coordinate value "Xmax" on the X axis at the right side of the window display region RD, the control module 11 determines that the window region RW has disappeared from the window display region RD.

As illustrated in FIG. 14B, in the case where the window region RW is moved leftward by the leftward flick operation and the movement amount is subtracted from a coordinate value "X2" on the X axis at the upper right corner of the window region RW before the movement or a coordinate value "X4" on the X axis at the lower right corner of the window region RW before the movement, when the coordinate value "X2" or "X4" after the movement reaches a coordinate value "0" on the X axis at the left side of the window display region RD, the control module 11 determines that the window region RW has disappeared from the window display region RD.

As illustrated in FIG. 14C, in the case where the window region RW is moved downward by the downward flick operation and the movement amount is added to a coordinate value "Y1" on a Y axis at the upper left corner of the window region RW before the movement or a coordinate value "Y2" on the Y axis at the upper right corner of the window region RW before the movement, when the coordinate value "Y1" or "Y2" after the movement reaches a coordinate value "Ymax" on the Y axis at the lower side of the window display region RD, the control module 11 determines that the window region RW has disappeared from the window display region RD.

As illustrated in FIG. 14D, in the case where the window region RW is moved upward by the upward flick operation and the movement amount is subtracted from a coordinate value "Y3" on the Y axis at the lower left corner of the window region RW before the movement or a coordinate value "Y4" on the Y axis at the lower right corner of the window region RW before the movement, when the coordinate value "Y3" or "Y4" after the movement reaches a coordinate value "Ymin" on the Y axis at the upper side of the window display region RD, the control module 11 determines that the window region RW has disappeared from the window display region RD.

When not determining that the window region RW has not disappeared from the window display region RD (S310: NO), the control module 11 terminates the back flick process. In contrast, when determining that the window region RW has disappeared from the window display region RD (S310: YES), the control module 11 returns the window region RW to the initial position (S311), and terminates the back flick process.

Returning to FIG. 11, after terminating the back flick process, the control module 11 returns to step S101. Then, the control module 11 monitors whether the front touch panel 4 has detected a touch operation and whether the back touch panel 7 has detected a touch operation (S101, S102).

While monitoring for a touch operation on the display 3 and in the operational region RO, the control module 11 determines whether the time measured by the second timer has exceeded a predetermined threshold (for example, ten seconds) (S115). After the movement of the window region RW by a drag operation or a flick operation in the operational region RO, when the time measured by the second timer has exceeded the threshold without any touch operation performed on the display 3 and in the operational region RO (S115: YES), the control module 11 determines that a timeout has occurred and returns the window region RW to the initial position (S108).

According to an embodiment, the window region RW on the display 3 is cut out according to the user's movement operation, and the cut window region RW is moved on the display 3. Accordingly, when holding the mobile phone 1 with one hand and performing an operation on the display 3 with the thumb, the user can move a distant object (the start icon 107 or the like) to be operated close to the thumb. This allows the user to perform an operation on the object without having to change his/her way to hold the mobile phone 1.

According to an embodiment, the operational region RO with the back touch panel 7 is provided on the back surface of the housing 2, and the window region RW can be moved by an operation (drag operation or flick operation) performed in the operational region RO. Accordingly, the window region RW can be moved without interfering with the operation on the display 3. Further, after performing an operation in the operational region RO with a finger other than a thumb, such as an index finger, the user can perform immediately an operation on the display 3 with the thumb. Accordingly, the user is allowed to perform a quick operation.

According to an embodiment, when any operation has been performed on the display 3 before completion of a drag operation in the operational region RO, the process according to the operation is executed. Accordingly, the user can perform an operation on the display 3 to execute a desired process in the middle of a drag operation in the operational region RO. This improves user convenience.

According to an embodiment, when a flick operation is repeatedly performed in the operational region RO to move the window region RW toward the outside of the display 3 and the window region RW disappears from the display 3, the window region RW is returned to a determined position (the initial position in an embodiment). This saves the user from having to perform another flick operation to cause the window region RW to return to appear again on the display 3. This improves user convenience.

According to an embodiment, the user can easily return the moved window region RW to the initial position only by performing an operation on the back key 105c, without performing another drag operation or flick operation in the operational region RO.

According to an embodiment, the back key 105c is arranged in the key region RK and is not moved together with movement of the window region RW. This eliminates a possibility that the back key 105c disappears from the display 3 and disables an operation.

According to an embodiment, the notification bar 100 is arranged in the pictogram region RP and is not moved together with movement of the window region RW. This eliminates a possibility that the notification bar 100 lies partially off the display 3 such that the user cannot view part of notification information displayed in the notification bar 100.

As in the foregoing, an embodiment of the present disclosure is described. However, the present disclosure is not limited by the foregoing embodiment or the like. An embodiment can be modified in various manners other than those described above.

Modification Example 1

FIG. 15 is a diagram describing the mobile phone 1 in a modification example 1.

In an embodiment, the control module 11 accepts upward, downward, rightward, and leftward flick operations in the operational region RO by the back flick process.

Alternatively, in addition to the upward, downward, rightward, and leftward flick operations, the control module 11 may accepts upward and rightward, upward and leftward, downward and leftward, and downward and rightward flick operations as in this modification example.

In this case, as illustrated in FIG. 15, for example, when the user has performed a downward and rightward flick operation in the operational region RO as the mobile phone 1 is seen from the front side, the control module 11 moves the window region RW by a predetermined amount in the downward and rightward direction.

This saves the user form having to perform two flick operations to move the window region RW in an oblique direction.

Modification Example 2

FIGS. 16A and 16B are diagrams describing the mobile phone 1 in a modification example 2.

In an embodiment, in the back flick process, when the window region RW has disappeared from the window display region RD, the window region RW is returned to the initial position.

Alternatively, as in this modification example, when the window region RW does not lie off the window display region RD in one of the X-axis and Y-axis directions but lies off the window display region RD in the other axis direction by a flick operation, the window region RW may be moved in the other axis direction and the window region RW may be returned to the initial direction only in the other axis direction.

As illustrated in FIG. 16A, when the window region RW does not lie off the window display region RD in the Y-axis direction but lies off the window display region RD in the X-axis direction, the window region RW is moved in the X-axis direction and is returned to the initial position only in the X-axis direction. The window region RW is still moved in the Y-axis direction.

As illustrated in FIG. 16B, when the window region RW does not lie off the window display region RD in the X-axis direction but lies off the window display region RD in the Y-axis direction, the window region RW is moved in the Y-axis direction and is returned to the initial position only in the Y-axis direction. The window region RW is still moved in the X-axis direction.

Modification Example 3

Figure 17:
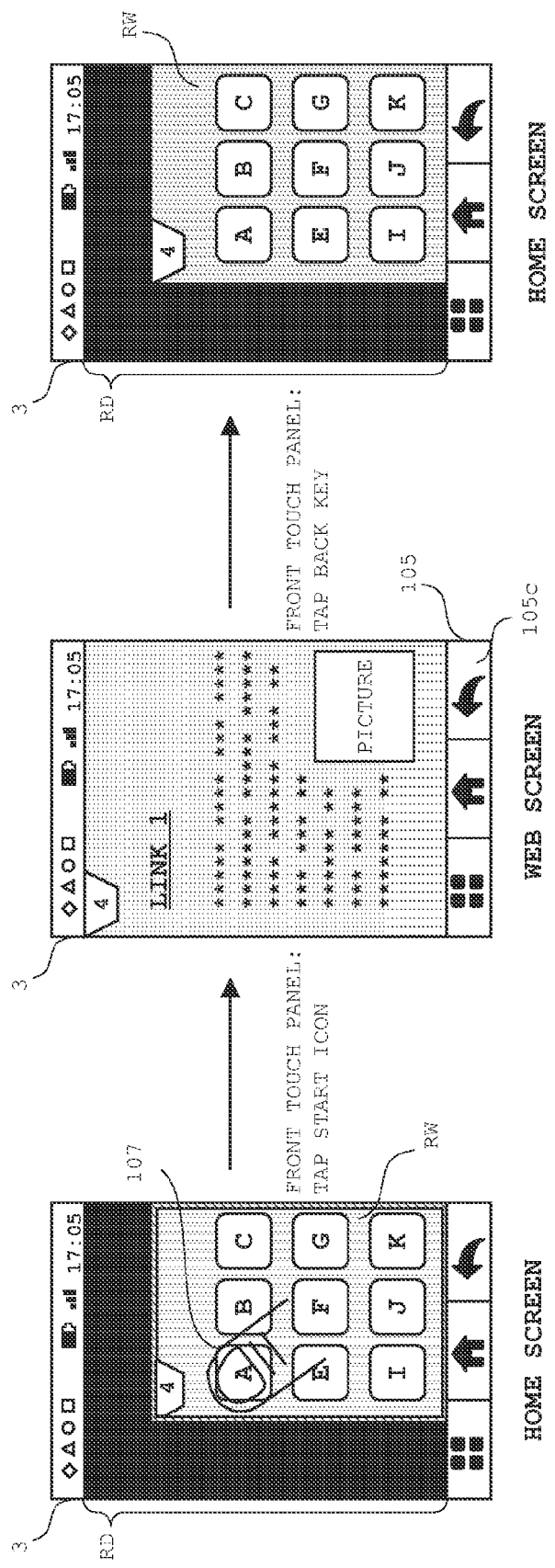
FIG. 17 is a diagram describing a mobile phone in a modification example 3.

FIG. 17 is a diagram describing the mobile phone 1 in a modification example 3.

In an embodiment, as illustrated in FIG. 5, while the window region RW is moved, when another application is started and then the previous application is started again by operating the back key 105c, the window region RW is arranged at the initial position on the display 3.

In this modification example, as illustrated in FIG. 17, when another application is started while the window region RW is moved, the control module 11 stores the position of the window region RW before the starting in the storage module 12. Then, when the previous application is started again by operating the back key 105c, the control module 11 reads the stored position from the storage module 12 and arranges the window region RW at the read position.

According to this configuration, the window region RW is arranged at the previous position, which saves the user from having to move the window region RW to operate the same object (start icon 107 or the like) as the previously performed one.

When a new application has been started, the control module 11 may start to measure time until the time limit is reached. When the back key 105c has been performed within the time limit, the control module 11 may arrange the window region RW at the position stored in the storage module 12, and when the back key 105c has been performed after expiration of the time limit, the control module 11 may arrange the window region RW at the initial position.

Other Modification Examples

In an embodiment, by performing a movement operation in the operational region RO, only the window region RW including an object to be performed is cut out from the screen displayed on the display 3, and the cut window region RW is moved. Alternatively, a region including the window region RW and the pictogram region RP may be cut out and moved. Also alternatively, the entire screen may be cut out and moved.

In an embodiment, the window region RW is moved by performing a movement operation in the operational region RO provided on the back surface of the housing 2. Alternatively, the movement operation may be performed on another operation module. For example, the window region RW may be moved by a drag operation or a flick operation on the display 3. In this case, however, in order to allow the movement operation to be accepted, the user needs to perform an operation such as a long-tap operation on the display 3 to shift from the normal operation mode to the movement mode in which to move the window region RW. Accordingly, the movement operation is slightly more complicated for the user.

In an embodiment, the notification tag 106 is arranged at the upper left corner of the window region RW. When the user is right-handed and holds the mobile phone 1 with the right hand, the window region RW is frequently moved rightward and thus the notification tag 106 is unlikely to disappear from the display 3 by movement of the window region RW. However, when the user is left-handed and holds the mobile phone 1 with the left hand, the window region RW is frequently moved leftward and thus the notification tag 106 is likely to disappear from the display 3 by movement of the window region RW. To eliminate this problem, when being moved up to the end of the display 3, the notification tag 106 may be held at that position. Alternatively, the user may be allowed to select at the upper right corner or the upper left corner of the window region RW the notification tag 106 is to be arranged. Also alternatively, the notification tag 106 may be arranged at the upper central part of the window region RW.

In an embodiment, upon completion of a drag operation, that is, when the finger has been released from the operational region RO, the moved window region RW is held at the position after the movement. Alternatively, when the finger has been released from the operational region RO, the window region RW may be returned to the initial position. In this case, the user needs to operate the start icon 107 or the like without releasing the finger in the state where the window region RW is moved.

In an embodiment, the movement amount of the window region RW by one flick operation is constant. Alternatively, the movement amount of the window region RW may be set according to the movement distance of the touch position by a flick operation. In this case, the longer the movement distance of the touch position is, the more the movement amount of the window region RW increases.

In an embodiment, the operational region RO on the housing 2 is made smaller than the window display region RD. Alternatively, the operational region RO may be the same in the size as the window display region RD. Also alternatively, the operational region RO may be made larger than the window display region RD, and may be the same in size as the display 3, for example.

The disclosure is not limited to a mobile phone but is also applicable to various mobile terminal devices such as personal digital assistants (PDA), tablets, and electronic book terminals. One or more of the functions described in this document may be performed by an appropriately configured module, part or unit. The terms "module," "part" or "unit" as used herein, individually or collectively refer to hardware, firmware, software and any associated hardware that executes the software, or any combination of these elements for performing the associated functions described herein. Additionally, various modules, parts or units can be discrete modules, parts or units. As would be apparent to one of ordinary skill in the art, however, two or more modules, parts or units may be combined to form a single module, part or unit, respectively, that performs the associated functions according to various embodiments of the disclosure. Conversely, a single module, part or unit may be divided into two or more modules, parts or units, respectively, that perform respective associated functions according to various embodiments of the disclosure.

What is claimed is:

1. A mobile terminal device, comprising:
   a casing having a plurality of surfaces;
   a display provided on a first surface of the casing and configured to display a screen comprising a window including an object;
   a first detection panel provided on the first surface to overlap at least part of the display and configured to detect an operation performed on the display module;
   a second detection panel provided on a second surface opposite to the first surface and configured to detect a movement operation; and
   at least one processor configured to, when the movement operation is detected on the second detection panel provided on the second surface,
      cut out at least the window of the screen on the display provided on the first surface, including the object, and
      move the cut window on the display provided on the first surface according to the movement operation detected on the second detection panel provided on the second surface.

2. The mobile terminal device according to claim 1, wherein the at least one processor is configured to, when an operation is detected on the first detection panel, switch the screen to a different screen corresponding to the operation.

3. The mobile terminal device according to claim 2, wherein the movement operation comprises a touch operation in which a touch position by the user is moved in a movement direction on the second detection panel provided on the second surface, and wherein the at least one processor moves the cut window on the display provided on the first surface in a direction corresponding to the movement direction.

4. The mobile terminal device according to claim 3, wherein the movement operation comprises at least one of a flick operation and a drag operation.

5. The mobile terminal device according to claim 4, wherein the movement operation comprises the drag operation, and wherein the at least one processor moves the cut window on the display on the first surface to follow the drag operation on the second detection panel provided on the second surface, and when an operation is detected on the first detection panel before completion of the drag operation on the second detection panel, executes a process corresponding to the detected operation.

6. The mobile terminal device according to claim 4, wherein the movement operation comprises the flick operation, and wherein the at least one processor moves the cut window on the display on the first surface according to the flick operation on the second detection panel provided on the second surface, by a predetermined amount in a direction corresponding to a direction of the flick operation, and when the cut window is moved to a position at which it disappears from the display according to the flick operation, arranges the cut window on the display at a predetermined position, instead of the position at which it disappears.

7. The mobile terminal device according to claim 2, wherein, when an operation is detected on the first detection panel, the at least one processor does not accept the movement operation detected on the second detection panel until after elapse of a predetermined period of time since execution of the operation.

8. The mobile terminal device according to claim 1, further comprising a back key configured to return the moved cut window to a position before the movement operation.

9. The mobile terminal device according to claim 8, wherein the back key is arranged on the screen, displayed on the display, in a region other than the window to be cut out on the screen.

10. The mobile terminal device according to claim 1, further comprising a notification area arranged on the screen in a region other than the window to be cut out on the screen.

11. The mobile terminal device according to claim 10, wherein the at least one processor arranges a notification object in the window to be cut out on the screen, and, when the notification object is operated, expands the notification area.

12. The mobile terminal device according to claim 11, wherein the notification object is initially arranged on the screen such that it abuts the notification area, and wherein moving the cut window on the display according to the movement operation comprises separating the notification object from the notification area.

13. The mobile terminal device according to claim 1, wherein the second detection panel is a different size than the first detection panel, and wherein moving the cut window on the display on the first surface according to the movement operation detected on the second detection panel comprises:
    determining a movement amount of the movement operation;
    multiplying the movement amount by a ratio; and
    moving the cut window on the display based on the multiplied movement amount.

14. The mobile terminal device according to claim 1, wherein the screen comprises a notification area that is separate from the window, and wherein the at least one processor moves only the window on the display when the movement operation is detected, while the notification area remains stationary.

15. The mobile terminal device according to claim 1, wherein the screen comprises a key area that is separate from the window, and wherein the at least one processor moves only the window on the display when the movement operation is detected, while the key area remains stationary.

16. A screen control method, comprising:
    displaying a screen comprising a window including an object on a display provided on a first surface of a casing;

determining whether a movement operation for moving the screen has been performed on a second surface opposite to the first surface; and when it is determined that the movement operation has been performed,
- cutting out at least the window of the screen on the display provided on the first surface, including the object, and
- moving the cut window on the display on the first surface according to the movement operation detected on the second surface.

17. A non-transitory computer readable storage medium including computer executable instructions for operating a mobile terminal device, wherein the computer executable instructions comprise:

displaying a screen comprising a window including an object on a display provided on a first surface of a casing;

determining whether a movement operation for moving the screen has been performed on a second surface opposite to the first surface; and when it is determined that the movement operation has been performed,
- cutting out at least the window of the screen on the display provided on the first surface, including the object, and
- moving the cut window on the display on the first surface according to the movement operation detected on the second surface.

* * * * *